US012799407B2

(12) United States Patent
Akah et al.

(10) Patent No.: US 12,799,407 B2
(45) Date of Patent: *Nov. 17, 2026

(54) RED MUD CATALYST FOR DEEP DEHALOGENATION OF PLASTIC DERIVED OIL AND PROCESSES USING THE SAME

(71) Applicant: Saudi Arabian Oil Company, Dhahran (SA)

(72) Inventors: Aaron Chi Akah, Dhahran (SA); Noor Nasser Al-Mana, Al Khobar (SA); Mohammed Z. Al-Bahar, Dhahran (SA); Rami A. Bamagain, Khobar (SA); Bandar A. Fadhel, Dhahran (SA); Layla Ali H. Al Ibrahim, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 176 days.

This patent is subject to a terminal disclaimer.

(21) Appl. No.: 18/907,911

(22) Filed: Oct. 7, 2024

(65) Prior Publication Data

US 2026/0098216 A1 Apr. 9, 2026

(51) Int. Cl.
*C10G 11/18* (2006.01)
*B01J 20/06* (2006.01)
(Continued)

(52) U.S. Cl.
CPC ............ *C10G 11/182* (2013.01); *B01J 20/06* (2013.01); *B01J 20/08* (2013.01); *B01J 23/745* (2013.01);
(Continued)

(58) Field of Classification Search
CPC . B01J 20/06; B01J 20/08; B01J 23/745; B01J 23/78; B01J 29/06; B01J 35/613;
(Continued)

(56) References Cited

U.S. PATENT DOCUMENTS 11,939,533 B2 3/2024 Akah
2019/0299491 A1 10/2019 Stanislaus et al.
(Continued)

FOREIGN PATENT DOCUMENTS

CN 105435795 A * 3/2016 ............ B01J 23/78
CN 114106876 A 3/2022
(Continued)

OTHER PUBLICATIONS

English-language machine translation of CN 105435795 A (Year: 2016).*
(Continued)

*Primary Examiner* — James C Goloboy
(74) *Attorney, Agent, or Firm* — DINSMORE & SHOHL LLP

(57) ABSTRACT

Processes for decontaminating a plastic derived oil include contacting a plastic derived oil stream containing halogen-containing compounds with a decontamination catalyst at a reaction temperature of 350-450° C. to produce a decontaminated plastic derived oil and a used decontamination catalyst. The decontamination catalyst includes from 5-40 wt. % red mud particles, from 20-60 wt. % matrix material, and from 10-30 wt. % binder, per unit weight of the decontamination catalyst. Contacting the plastic derived oil stream with the decontamination catalyst at the reaction conditions causes halogen-containing compounds to react to form hydrocarbons and hydrogen halides, which further react with the red mud particles to produce metal halides on surfaces of the red mud particles. The decontaminated plastic derived oil has a concentration of the halogen-containing compounds less than a concentration of the halogen-containing compounds in the plastic derived oil stream.

20 Claims, 5 Drawing Sheets

(51) Int. Cl.

| | |
|---|---|
| ***B01J 20/08*** | (2006.01) |
| ***B01J 23/745*** | (2006.01) |
| ***B01J 23/78*** | (2006.01) |
| ***B01J 29/06*** | (2006.01) |
| ***B01J 35/61*** | (2024.01) |
| ***B01J 35/63*** | (2024.01) |
| ***B01J 35/64*** | (2024.01) |
| ***C10G 25/09*** | (2006.01) |

(52) U.S. Cl.

CPC ............... *B01J 23/78* (2013.01); *B01J 29/06* (2013.01); *B01J 35/613* (2024.01); *B01J 35/633* (2024.01); *B01J 35/651* (2024.01); *C10G 25/09* (2013.01); *C10G 2300/1003* (2013.01); *C10G 2300/201* (2013.01); *C10G 2300/703* (2013.01)

(58) Field of Classification Search

CPC ..... B01J 35/633; B01J 35/651; C10G 11/182; C10G 25/09; C10G 2300/1003; C10G 2300/201; C10G 2300/703

See application file for complete search history.

(56) References Cited

U.S. PATENT DOCUMENTS

| | | | | |
|---|---|---|---|---|
| 2023/0294083 | A1 | 9/2023 | De Silva et al. | |
| 2024/0182384 | A1* | 6/2024 | Jeon ..................... | B01D 21/267 |
| 2025/0215336 | A1 | 7/2025 | Akah et al. | |

FOREIGN PATENT DOCUMENTS

| | | | |
|---|---|---|---|
| EP | 4379020 | A1 | 6/2024 |
| KR | 102664581 | B1 | 5/2024 |
| KR | 20240056856 | A | 5/2024 |
| WO | 2023091908 | A1 | 5/2023 |
| WO | 2025226440 | A1 | 10/2025 |
| WO | 2025226441 | A1 | 10/2025 |

OTHER PUBLICATIONS

Lingaiah, N., Uddin, M.A., Muto, A., Imai, T., Sakata, Y., "Removal of organic chlorine compounds by catalytic dehydrochlorination for the refinement of municipal waste plastic derived oil", Fuel, 2001, 80, 1901-1905 (Year: 2001).*

Yanik, J., Uddin, M.A., Sakata, Y., "The Effect of Red Mud on the Liquefaction of Waste Plastics in Heavy Vacuum Gas Oil", Energy & Fuels, 2001, 15, 163-169 (Year: 2001).*

Notification of Transmittal of the International Search Report and the Written Opinion of the International Searching Authority, or the Declaration dated Jan. 19, 2026 pertaining to International application No. PCT/US2025/046678 filed Sep. 17, 2025, pp. 1-21.

Park, Ki-Bum et al. "Separate two-step and continuous two-stage pyrolysis of a waste plastic mixture to produce a chlorine-depleted oil", Energy, Nov. 11, 2021, pp. 1-12, vol. 244, Elsevier, Amsterdam, NL.

Lingaiah, N et al. "Removal of organic chlorine compounds by catalytic dehydrochlorination for the refinement of municipal waste plastic derived oil", Fuel, Oct. 1, 2001, pp. 1901-1905, vol. 80, No. 13, IPC Science and Technology Press , Guildford, GB.

Yanik, Jale et al., "The Effect of Red Mud on the Liquefaction of Waste Plastics in Heavy Vacuum Gas Oil", Energy & Fuels, Dec. 5, 2000, pp. 163-169, vol. 15, No. 1.

Jiang et al., "Understanding the Dechlorination of Chlorinated Hydrocarbons in the Pyrolysis of Mixed Plastics", ACS Sustainable Chemistry & Engineering, vol. 9, pp. 1576-1589, 2021.

Vityuk et al., "Purifying and upgrading of waste plastics pyrolysis oils", www.digitalrefining. com (PTQ Q3), pp. 62-65, 2023.

* cited by examiner

RED MUD CATALYST FOR DEEP DEHALOGENATION OF PLASTIC DERIVED OIL AND PROCESSES USING THE SAME

BACKGROUND

Field

The present disclosure generally relates to catalysts and processes for recycling solid waste plastic, more specifically, catalysts and processes for removing contaminants from plastic derived oils produced from solid waste plastic.

Technical Background

The use of plastics in commercial and industrial applications has become prolific. The increasing use of plastics worldwide has increased the generation of waste plastic, which presents a sustainability opportunity. Plastic is a synthetic or semisynthetic organic polymer composed of mainly carbon and hydrogen. Further, plastics tend to be durable, with a slow rate of degradation, therefore, they stay in the environment for a long time and are not prone to rapid breakdown upon disposal. Pure plastics are generally insoluble in water and nontoxic. However, some additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants, any of which may be used during preparation of the plastics to change its composition and properties. Development of processes for converting waste plastics into reusable materials, such as but not limited to chemical products, intermediates, or low carbon footprint fuels is continuing. Plastics pyrolyze at high temperatures and polymers can be converted back to their original monomers or smaller polymers, as gas or liquid, and can be recovered.

SUMMARY

Oils derived from waste plastics can contain hydrocarbon compounds useful as feedstocks for upgrading to greater value chemicals and intermediates through hydrocarbon converting process, such as but not limited to fluidized catalytic cracking (FCC) processes. However, the additives added to the plastics during production can present challenges in effectively utilizing the recovered products from pyrolysis. Upon pyrolysis, the additives end-up in the pyrolysis products and thus require further processing to generate useful products. Additionally, the oils produced from pyrolysis of plastic waste can present a challenge due to the presence of halogen-containing compounds, such as those resulting from the presence of polyvinyl chloride (PVC) or other halogen-containing plastics. PVC is one of the most abundant plastics used for consumable goods. Waste plastic can contain from 1 weight percent (wt. %) to 5 wt. % PVC or other halogen-containing plastics. However, recycling of used PVC and other halogen-containing plastics is very difficult due to the presence of chlorine or other halogens in the structure.

Plastic derived oils can present an additional processing challenge due to the wide boiling point temperature range of the plastic derived oils, such as $C_5$ to $C_{25}$ or greater (boiling point temperatures of from 30° C. to 400° C. or even greater than 400° C.). Plastic derived oils can also include compounds with different functional groups and families of organic compounds such as but not limited to oxygenates, aromatic compounds, olefins, alkanes, other hydrocarbon compounds, or combinations of these. The direct use of plastic waste derived oil in catalytic cracking to produce circular chemicals can lead to problems downstream because of the presence of halogen-containing compounds, such as but not limited to chlorine-containing hydrocarbon compounds.

Accordingly, an ongoing need exists for catalysts and processes for removing contaminants, such as but not limited to halogen-containing compounds, from plastic derived oils to produce hydrocarbon feedstocks suitable for further processing into greater value chemicals and intermediates. The present disclosure satisfies these needs by providing a decontamination catalyst comprising red mud particles and processes using the decontamination catalyst for decontaminating the plastic derived oils through reactive adsorption. The processes of the present disclosure may accomplish deep dehalogenation of the plastic derived oil to produce a decontaminated plastic derived oil stream that may be suitable as a hydrocarbon feedstock for further conversion to greater value chemical products and intermediates. The decontamination catalyst includes red mud particles and is combined with a matrix material and a binder to form decontamination catalyst particles that are suitable for use in a fluidized bed reactor, such as an FCC reactor. The red mud particles in the decontamination catalyst cause halogen-containing compounds in the plastic derived oil stream to undergo reactive adsorption in which the halogen-containing compounds react to form hydrogen halides (e.g., HCl) and hydrocarbons and the resulting hydrogen halides continue to react with the metal oxides at the surface of the red mud particles to produce metal halides adsorbed onto the surfaces of the red mud particles. Thus, the reactive adsorption traps the hydrogen halides, such as HCl, as metal halides attached to the surfaces of the red mud particles. This effectively removes the halogen atoms from the plastic derived oil to produce the decontaminated plastic derived oil having a reduced concentration of halogen-containing compounds.

The present disclosure is also directed to processes for decontaminating, such as deep dehalogenation, the plastic derived oil to produce a decontaminated plastic derived oil suitable for use as a hydrocarbon feedstock to a downstream conversion process, such as but not limited to a fluidized catalytic cracking (FCC) system, steam cracking system, hydrocracking system, or other refinery process. The present disclosure may also include processes for producing a decontaminated plastic derived oil from solid waste plastic. The processes disclosed herein may include contacting a plastic derived oil stream with the decontamination catalyst at a reaction temperature, where contact of the plastic derived oil with the decontamination catalyst causes dehalogenation of the plastic derived oil through reactive adsorption of the halogen-containing compounds.

According to one or more aspects of the present disclosure, a process for decontaminating a plastic derived oil may include contacting a plastic derived oil stream with a decontamination catalyst in a fluidized bed reactor at a reaction temperature of from 350° C. to 450° C. to produce a decontaminated plastic derived oil and a used decontamination catalyst. The plastic derived oil stream comprises halogen-containing compounds. The decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst. The contacting the plastic derived oil stream with the decontamination catalyst at the reaction conditions causes at least a portion of the halogen-containing compounds to react to form hydrocarbons and hydrogen halides, where the hydrogen halides further react with the red mud particles to produce metal halides on surfaces of the red mud particles. The decontaminated plastic derived oil has a concentration of the halogen-containing compounds less than a concentration of the halogen-containing compounds in the plastic derived oil stream.

According to one or more other aspects of the present disclosure, a system for upgrading plastic derived oil may include a fluidized bed reactor containing a decontamination catalyst, where the decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst. The fluidized bed reactor is configured to contact a plastic derived oil stream with the decontamination catalyst to produce decontaminated plastic derived oil. The system may further include a fluid-solid separation unit disposed at an outlet end of the fluidized bed reactor, where the fluid-solid separation unit may be configured to separate the decontaminated plastic derived oil from a used decontamination catalyst. The system may further include a catalyst regenerator disposed downstream of the fluid-solid separation unit, where the catalyst regenerator may be configured to regenerate the used decontamination catalyst to produce a regenerated decontamination catalyst. The catalyst regenerator may be in fluid communication with the fluidized bed reactor to pass the regenerated decontamination catalyst back to the fluidized bed reactor.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
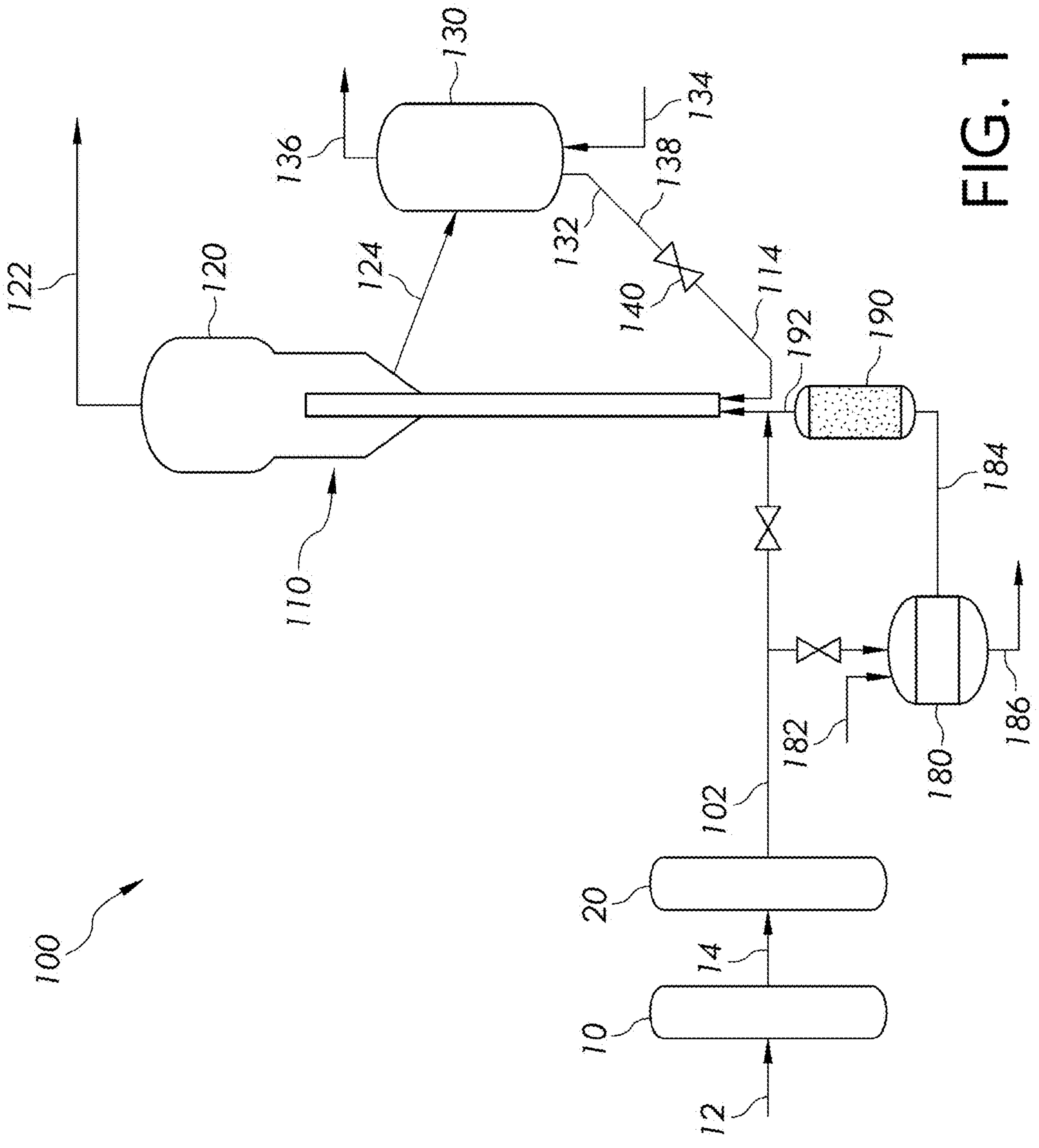
FIG. 1 schematically depicts a generalized flow diagram of a fluidized bed reactor system for producing a decontaminated plastic derived oil from solid plastic waste, according to embodiments shown and described in this disclosure.
Figure 2:
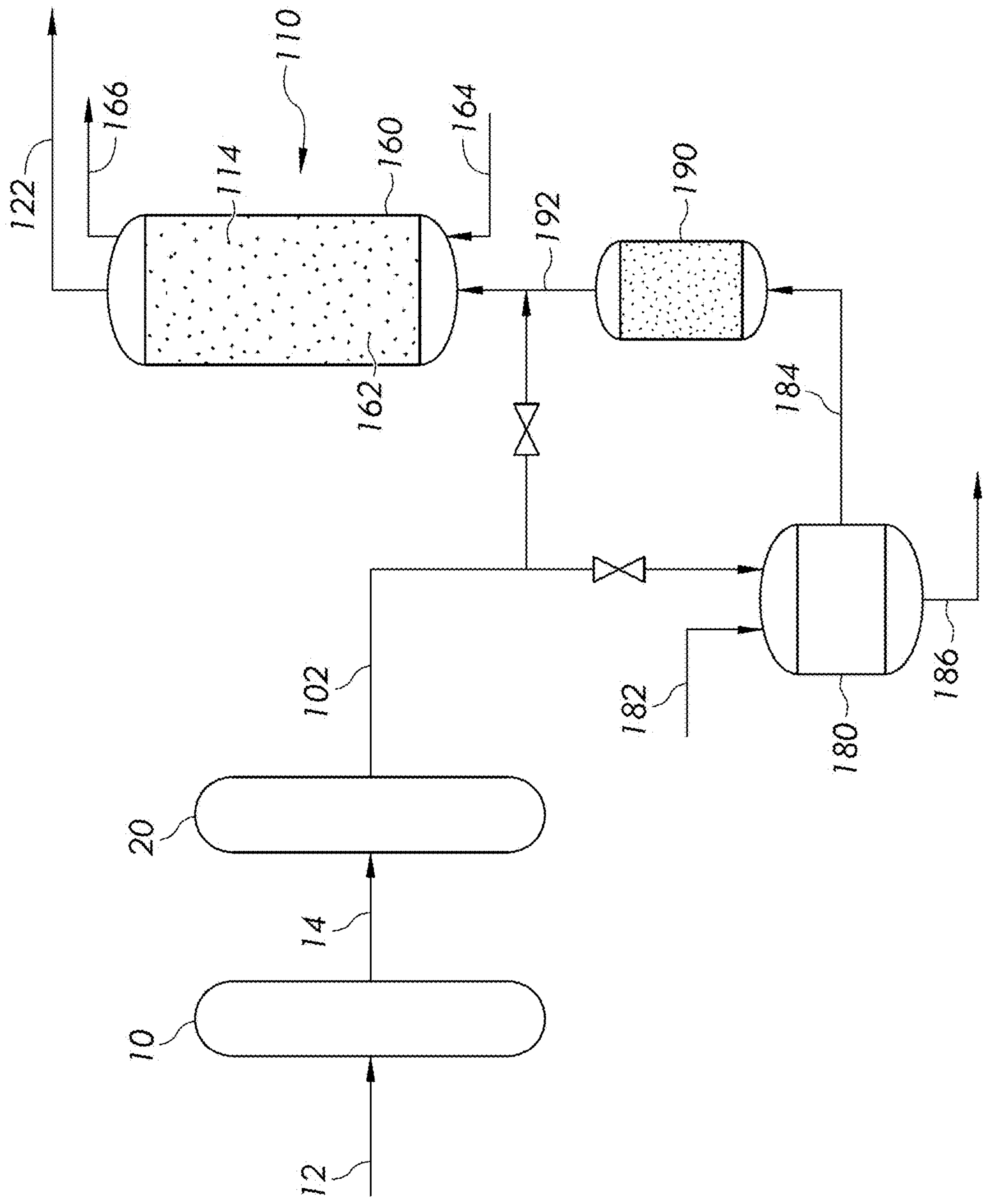
FIG. 2 schematically depicts a generalized flow diagram of a fixed bed reactor system for converting solid plastic waste to produce a decontaminated plastic derived oil suitable as a hydrocarbon feedstock for further processing, according to embodiments shown and described in this disclosure.
Figure 3:
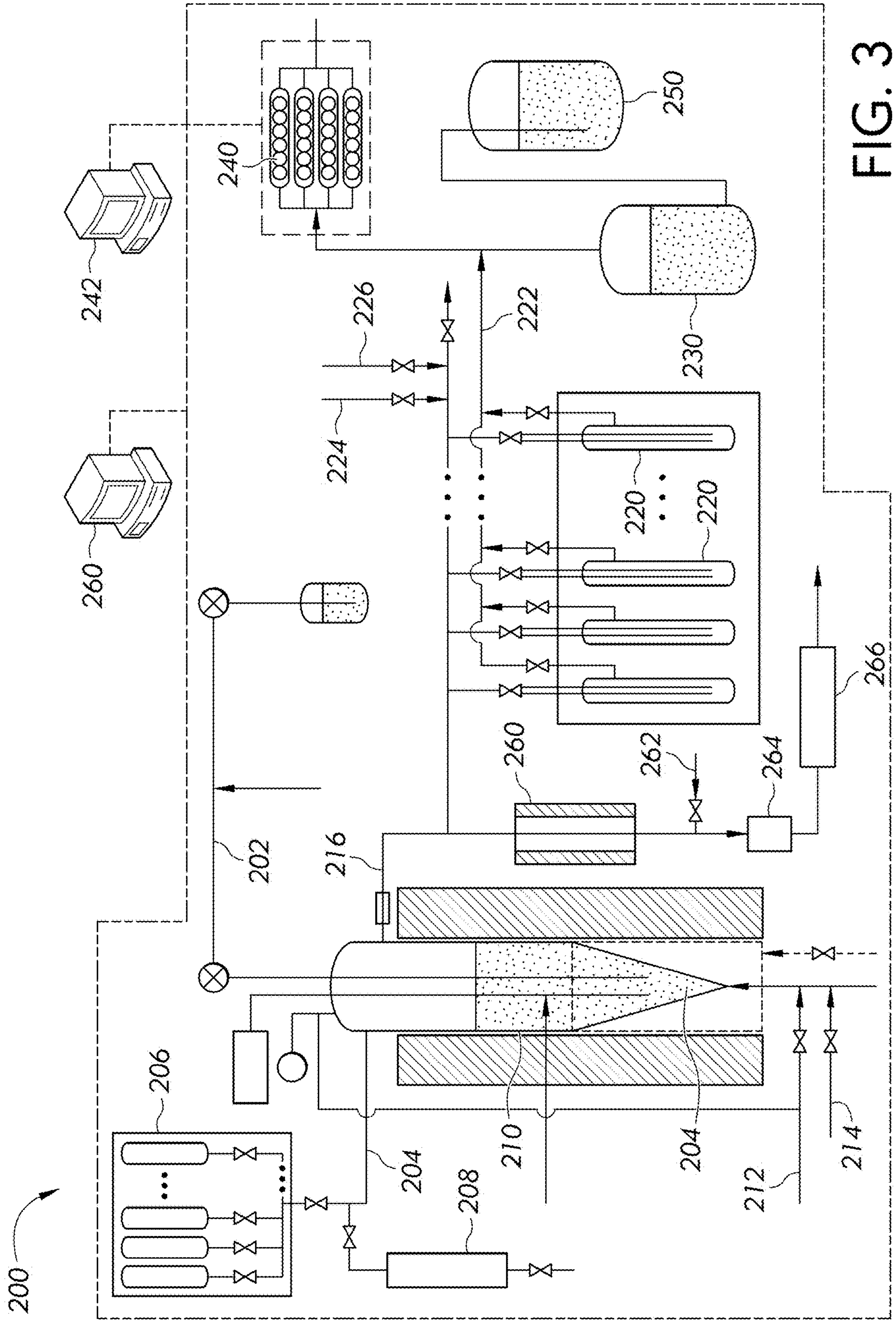
FIG. 3 schematically depicts a test reactor system for evaluating catalyst performance of the decontamination catalyst, according to embodiments shown and described in this disclosure.

For the purpose of describing the simplified schematic illustrations and descriptions of FIGS. 1-3, some of the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-3. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to decontamination catalysts and processes for removing contaminants from plastic derived oils with the decontamination catalysts to produce hydrocarbon feedstocks. The decontamination catalysts of the present disclosure comprises red mud particles, a matrix material, and a binder. Referring now to FIG. 1, one embodiment of a system 100 for removing contaminants from plastic derived oil stream 102 is schematically depicted. The system 100 includes a fluidized bed reactor system 110. The fluidized bed reactor system 110 may include a fluidized bed reactor 112 containing the decontamination catalyst 114, a fluid-solid separation unit 120 disposed at an outlet end of the fluidized bed reactor 112, and a catalyst regenerator 130 disposed downstream of the fluid-solid separation unit 120. The decontamination catalyst 114 comprises from 5 wt. % to 40 wt. % red mud particles, from 20 wt. % to 60 wt. % matrix material, and from 10 wt. % to 30 wt. % binder, based on the total weight of the decontamination catalyst 114. The fluidized bed reactor 112 is configured to contact a plastic derived oil stream 102 with the decontamination catalyst 114 to produce a decontaminated plastic derived oil 122. The fluid-solid separation unit 120 may be configured to separate the decontaminated plastic derived oil 122 from a used decontamination catalyst 124. The catalyst regenerator 130 may be configured to regenerate the used decontamination catalyst 124 to produce a regenerated decontamination catalyst 132. The catalyst regenerator 130 may be in fluid communication with the fluidized bed reactor 112 to pass the regenerated decontamination catalyst 132 back to the fluidized bed reactor 112 as at least a portion of the decontamination catalyst 114.

The system 100 may be used in processes for decontaminating the plastic derived oil stream 102. The processes disclosed herein comprise contacting the plastic derived oil stream 102 with the decontamination catalyst 114 in a fluidized bed reactor 112 at a reaction temperature of from 350° C. to 450° C. to produce the decontaminated plastic derived oil 122 and the used decontamination catalyst 124. The plastic derived oil stream 102 comprises halogen-containing compounds, and the decontamination catalyst 114 comprises from 5 wt. % to 40 wt. % red mud particles, from 20 wt. % to 60 wt. % matrix material, and from 10 wt. % to 30 wt. % binder, based on the total weight of the decontamination catalyst 114. Contacting the plastic derived oil stream 102 with the decontamination catalyst 114 at reaction conditions causes at least a portion of the halogen-containing compounds in the plastic derived oil stream 102 to react to form hydrocarbons and hydrogen halides, where the hydrogen halides further react with the red mud particles in the decontamination catalyst 114 to produce metal halides on surfaces of the red mud particles. The decontaminated plastic derived oil 122 has a concentration of the halogen-containing compounds less than a concentration of the halogen-containing compounds in the plastic derived oil stream 102. The system 100 and processes of the present disclosure result in deep dehalogenation of the plastic derived oil to produce a decontaminated plastic derived oil stream that may be suitable as a hydrocarbon feedstock for further conversion to greater value chemical products and intermediates through FCC processes, hydrocracking processes, steam cracking processes, reforming, or other downstream refinery processes.

As used in this disclosure, the term "catalyst" refers to any substance that increases the rate of a specific chemical reaction. Catalysts and catalyst components described in this disclosure can be utilized to promote various reactions, such as, but not limited to catalytic cracking, aromatic cracking, dehalogenation, other chemical reactions, or combinations of these.

As used in this disclosure, the term "used catalyst", such as "used decontamination catalyst," refers to catalyst that has been contacted with reactants but has not been regenerated to restore at least a portion of the catalytic activity to the catalyst. The term "regenerated catalyst" refers to a catalyst that has been contacted with reactants in a reactor at reaction conditions and then regenerated in a regenerator or through a regeneration process to increase the catalytic activity, the temperature, or both of the regenerated catalyst.

As used in this disclosure, the term "aromatic compounds" refers to compounds having one or more aromatic ring structures. The term "light aromatic compounds" refers to compounds having an aromatic ring structure, with or without substitution, and from six to eight carbon atoms. The term "BTEX" refers to any combination of one or a plurality of benzene, toluene, ethylbenzene, para-xylene, meta-xylene, and ortho-xylene.

As used in this disclosure, the term "xylenes," when used without a designation of the isomer, such as the prefix para, meta, or ortho, refers to one or more of meta-xylene, ortho-xylene, para-xylene, and mixtures of these xylene isomers.

As used in this disclosure, the terms "butenes" and "mixed butenes" refers to 1-butene, cis-2-butene, trans-2-butene, isobutene, and combinations of these. As used in this disclosure, the term "normal butenes" refers to 1-butene, cis-2-butene, trans-2-butene, and any combination thereof, but not including isobutene.

As used in this disclosure, the terms "low carbon footprint fuels" and "low carbon footprint fuel components" refer to fuels and/or fuel components derived from non-fossil origin in contrast to conventional fuels which are produced directly from petroleum extracted from subterranean sources. The "low carbon footprint fuels" or "low carbon footprint fuel components" are produced sustainably from municipal or organic waste, sustainable biomass, renewables, and circular $CO_2$. Production and use of the low carbon footprint fuels and fuel components result in very little or no additional $CO_2$ generated. Low carbon footprint fuels and fuel components can help to reduce greenhouse emissions and mitigate the effects of climate change.

As used in this disclosure, the term "circular chemicals" refers to chemicals that are derived from the process of recycling waste materials back to produce useful chemical products and intermediates.

As used in this disclosure, the terms "boiling point temperature", or "boiling temperature", or "boiling point" refer to the temperature at which a compound or composition boils at atmospheric pressure, unless otherwise stated.

As used in this disclosure, the term "initial boiling point" or "IBP" of a composition refers to the temperature at which the constituents of the composition having the lowest boiling point temperature begin to transition from the liquid phase to the vapor phase.

As used in this disclosure, the term “final boiling point” or “FBP” of a composition refers to the temperature at which the greatest boiling temperature constituents of the composition transition from the liquid phase to the vapor phase.

As used in this disclosure, the term “separation unit” refers to any separation device that at least partially separates one or more chemicals in a mixture from one another. For example, a separation unit may selectively separate different chemical species from one another, forming one or more chemical fractions. Examples of separation units include, without limitation, distillation columns, cryogenic distillation units, fractionators, flash drums, knock-out drums, knock-out pots, centrifuges, filtration devices, traps, scrubbers, expansion devices, membranes, solvent extraction devices, pressure swing adsorption units, high-pressure separators, low-pressure separators, fluid-solid separators, and the like. It should be understood that separation processes described in this disclosure may not completely separate all of one chemical consistent from all of another chemical constituent. It should be understood that the separation processes described in this disclosure “at least partially” separate different chemical components from one another, and that even if not explicitly stated, it should be understood that separation may include only partial separation. As used in this disclosure, one or more chemical constituents may be “separated” from a process stream to form a new process stream. Generally, a process stream may enter a separation unit and be divided or separated into two or more process streams of desired composition.

As used in this disclosure, the terms “upstream” and “downstream” refer to the relative positioning of unit operations with respect to the direction of flow of the process streams through the system. A first unit operation of a system is considered “upstream” of a second unit operation if process streams flowing through the system encounter the first unit operation before encountering the second unit operation. Likewise, a second unit operation is considered “downstream” of the first unit operation if the process streams flowing through the system encounter the first unit operation before encountering the second unit operation.

As used in this disclosure, passing a stream or effluent from one unit “directly” to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent, unless otherwise specifically stated in the present disclosure. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, the term “effluent” refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that effluent may be passed. For example, a slip stream (having the same composition) may carry some of the effluent away, meaning that only a portion of the effluent may enter the downstream system unit. The terms “reaction effluent” or “reactor effluent” are more particularly used to refer to streams that are passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or diluents added to the stream). It should also be understood that components of a stream are disclosed as passing from one system component to another when a stream comprising that component is disclosed as passing from that system component to another. For example, a disclosed “olefin stream” passing to a first system component or from a first system component to a second system component should be understood to equivalently disclose the “olefin compounds” passing to the first system component or passing from a first system component to a second system component.

The demand for circular chemicals, which can be used for the production of chemical intermediates used in production of polymers and plastics as well as for fuel components, is steadily increasing. Circular chemicals can include monomers, such as ethylene, propylene, butenes, benzene, xylenes, and toluene, which are produced from plastic waste and plastic derived oil. These monomers can then be used again for the production of polymers, such as polyethylene, polypropylene, and polyethylene terephthalate. They are called circular chemicals because they are derived from the process of recycling waste materials back to produce useful chemical products and intermediates. Converting plastic waste can also produce low carbon footprint fuel components, such as gasoline, jet fuels, or diesel fuels, which can provide additional sources of fuel with reduced $CO_2$ generation, compared to fuel components derived from fossil fuels extracted from subterranean sources.

Plastic derived oils have good properties and contain hydrocarbon constituents useful for application as chemical intermediates and fuel blending components or useful as hydrocarbon feedstocks for further upgrading to chemical intermediates and fuel components. However, plastic derived oils can include halogen-containing compounds, such as but not limited to chloro-organic compounds, and other contaminants resulting from the types of solid waste plastic and additives included in the plastics, and the plastic derived oils can have a broad boiling point temperature range, such as from 30° C. to 400° C., or even greater than 400° C. Plastic derived oils can also include compounds with different functional groups and families of organic compounds, such as but not limited to oxygenates, aromatic compounds, olefins, alkanes, other hydrocarbon compounds, or combinations of these.

The direct use of plastic waste derived oils in converting processes, such as catalytic cracking, to produce chemical products, intermediates, or fuel components can lead to problems because of the presence of the halogen-containing compounds in the plastic derived oils. These problems can include corrosion caused by the breakdown of halogen-containing compounds, such as organic chlorides, to form hydrogen halides, such as HCl, which are corrosive and can attack refinery equipment such as pipes, valves and heat exchangers, leading to leaks, equipment failure, and costly repairs. The presence of halogen-containing compounds can also poison or damage catalysts, such as cracking catalysts, hydrocracking catalysts, reforming catalysts, or other catalysts, used in downstream refining processes. This catalyst poisoning can reduce the efficiency of the refining process, leading to lower quality products and process inefficiencies. Halogen-containing compounds, such as organic halides, can form salts, such as but not limited to ammonium chloride ($NH_4Cl$), that can foul refinery equipment, such as pipes or heat exchangers. Halogen-containing compounds can also contaminate refined products such as gasoline and diesel fuels, resulting in product quality problems such as but not limited to engine knocking and fuel injector fouling.

Typical decontamination processes for removing halogens from plastic derived oils rely on simple physical adsorption (physisorption) at lower temperatures (e.g., temperatures from room temperature (25° C.) up to about 200° C.) to remove hydrogen halides, such as HCl, and some simpler organic halides from the plastic derived oil. However, physical adsorption results in adsorption of the organic halides onto the surfaces of the adsorbents, which reduces hydrocarbons in the plastic derived oil. For instance, the hydrocarbon parts of the organic halide compounds are also adsorbed to the adsorbent along with the halogen atom. Physical adsorption at low temperatures less than 300° C. may result in little or no decomposition of halogen-containing compounds in the plastic derived oil. Thus, valuable hydrocarbons from the plastic derived oil are also removed along with the halogen atoms, which reduces the yield of greater value chemicals and intermediates produced from the treated plastic derived oil. Additionally, larger more complex halogen-containing compounds, such as but not limited to chloro-oxygenates, chloro-naphthenes, chloro-aromatics, or other more complex halogen-containing compounds, may not be adsorbed due to the halogen functional groups being inaccessible to the adsorbents, such as by being embedded in larger molecules, or stabilized by nearby functional groups or ring structures. Thus, conventional methods of removing halides through physical adsorption alone may not be able to remove more complex halogen-containing compounds. Additionally, physical adsorption may also be reversible.

Thus, an ongoing need exists for more efficient decontamination catalysts and processes for decontaminating plastic derived oils, such as through deep dehalogenation to remove halogen-containing compounds, to produce a decontaminated plastic derived oil suitable for use as a hydrocarbon feedstock for converting into greater value chemicals and intermediates through downstream catalytic cracking or other refinery processes. The present disclosure solves these problems in the art by providing a decontamination catalyst comprising red mud particles, where the red mud particles are combined with a matrix material and a binder to produce the decontamination catalyst that is suitable for use in a fluidized bed reactor. The decontamination catalyst may be used in a process for decontaminating plastic derived oil. The processes disclosed herein for decontaminating plastic derived oil may include contacting a plastic derived oil stream with the decontamination catalyst in a fluidized bed reactor at a reaction temperature of from 350° C. to 450° C. to produce a decontaminated plastic derived oil and a used decontamination catalyst. The plastic derived oil stream comprises halogen-containing compounds. The decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst.

Contacting the plastic derived oil stream with the decontamination catalyst at reaction conditions causes reactive adsorption of the halogen-containing compounds. In particular, contacting the plastic derived oil stream with the decontamination catalyst of the present disclosure causes at least a portion of the halogen-containing compounds to react, such as through cracking reactions, to form hydrocarbons and hydrogen halides, and the hydrogen halides further react with the red mud particles to produce metal halides on surfaces of the red mud particles. The decontaminated plastic derived oil has a concentration of the halogen-containing compounds less than a concentration of the halogen-containing compounds in the plastic derived oil stream. The hydrocarbons separated from the halogen atoms during reactive adsorption stay in the decontaminated plastic derived oil.

The decontamination catalyst and processes of the present disclosure may produce a decontaminated plastic derived oil that is suitable for conversion to greater value chemicals and intermediates through one or more downstream refinery processes, such as catalytic cracking. The decontamination catalyst and process of decontaminating the plastic derived oil with the decontamination catalyst provide greater removal efficiency of halogen compounds compared to conventional methods, such as physical adsorption. The reactive adsorption is also irreversible, meaning that the halogen-containing compounds, once cracked to form the hydrocarbon and the hydrogen halide and the hydrogen halide reacted to form the metal chlorides, cannot desorb back into the plastic derived oil. The decontamination catalyst and processes of the present disclosure may increase the amount of hydrocarbons in the decontaminated plastic derived oil by separating the hydrocarbon parts of the organic halide compounds from the halogen atoms and only adsorbing the halogen atoms as metal halides on the surfaces of the red mud particles. Thus, more of the hydrocarbons from the plastic derived oil stream remain in the decontaminated plastic derived oil, which may increase the yield of greater value chemicals and intermediates derived from the plastic derived oil by downstream refinery processes compared to conventional methods of decontaminating the plastic derived oil.

The processes of the present disclosure may also reduce corrosion in downstream equipment, which may reduce equipment failure and downtime. The process of the present disclosure may reduce catalyst poisoning and damage for catalysts used in downstream refinery processes and may reduce or prevent fouling from salt formation. The process of the present disclosure may also reduce contamination in the greater value chemicals and intermediates produced from the decontaminated plastic derived oil compared to greater value chemicals and intermediates produced from plastic derived oil without decontamination or plastic derived oils decontaminated through other processes, among other features.

The greater value chemicals and intermediates—such as fuel, fuel components, or chemical intermediates—produced from the decontaminated plastic derived oil can be considered to have low carbon footprint. Low carbon footprint fuels and fuel components can help to reduce greenhouse emissions and mitigate the effects of climate change. The greater value chemicals and intermediates produced from the decontaminated plastic derived oils may be circular chemicals, in that they are chemicals recovered from waste and reused to make additional products. The decontamination catalyst and processes of the present disclosure can enable the recycling of a broader range of types of solid waste plastic while reducing downstream problems caused by halogen-containing compounds (such as organochlorides) or other contaminants. The decontamination catalysts and processes also provide a beneficial use for a red mud, which is an industrial waste product produced from the production of alumina from bauxite through the Bayer process. The decontamination catalyst and processes of the present disclosure can be easily integrated into existing petroleum refineries and petrochemical installations, such as existing FCC reactor systems, among other features.

Referring again to FIG. 1, one embodiment of a system 100 for decontaminating a plastic derived oil stream 102 is schematically depicted. The system 100 may include at least a plastic derived oil stream 102 and a fluidized bed reactor system 110. The fluidized bed reactor system 110 may comprise the fluidized bed reactor 112, the fluid-solid separation unit 120 downstream of the fluidized bed reactor 112, and the catalyst regenerator 130. The fluidized bed reactor system 110 may be configured to contact the plastic derived oil stream 102 with the decontamination catalyst 114 in the fluidized bed reactor 112 at reaction conditions to produce the decontaminated plastic derived oil stream 122 and the used regeneration catalyst 124, separate the decontaminated plastic derived oil 122 from the used decontamination catalyst 124, and regenerate the used decontamination catalyst 124 to produce a regenerated decontaminated catalyst 132.

The fluidized bed reactor 112 may be configured to contact the plastic derived oil stream 102 with the decontamination catalyst 114 at reaction conditions sufficient to cause halogen-containing compounds in the plastic derived oil stream 102 to undergo reactive adsorption to produce hydrocarbons and hydrogen halides, such as HCl, and to adsorb the hydrogen halides onto the surfaces of the decontamination catalyst 114. The contacting produces the decontaminated plastic derived oil 122 and the used decontamination catalyst 124. The fluidized bed reactor system 110 may further comprise the fluid-solid separation unit 120, which may be disposed at an outlet end of the fluidized bed reactor 112. The fluid-solid separation unit 120 may be configured to separate the decontaminated plastic derived oil 122 from the used decontamination catalyst 124. The fluidized bed reactor system 110 may further include the catalyst regenerator 130 disposed downstream of the fluid-solid separation unit 120. The catalyst regenerator 130 may be configured to regenerate the used decontamination catalyst 124 to produce a regenerated decontamination catalyst 132, which may be passed back to the fluidized bed reactor 112 as at least a portion of the decontamination catalyst 114.

The plastic derived oil stream 102 may be a liquid stream comprising hydrocarbons and may be produced through melting, dehalogenation, and pyrolysis of solid waste plastics. As previously discussed, the plastic derived oil stream 102 may include hydrocarbons, such as but not limited to aromatic compounds, olefins, alkanes, other hydrocarbon compounds, and combinations of these hydrocarbons. Additionally, the plastic derived oil stream 102 may include other organic compounds, such as but not limited to oxygenates, halogen-containing compounds such as organic halide compounds, plastic additives, and other contaminants. The plastic derived oil stream 102 may comprise a concentration of halogen-containing compounds of from 10 part per million by weight (ppmw) to 500 ppmw. In embodiments, the plastic derived oil stream 102 may comprise a concentration of halogen-containing compounds of from 10 ppmw to 400 ppmw, from 10 ppmw to 300 ppmw, from 50 ppmw to 500 ppmw, from 50 ppmw to 400 ppmw, from 50 ppmw to 300 ppmw, from 100 ppmw to 500 ppmw, from 100 ppm to 400 ppmw, from 100 ppmw to 300 ppmw, from 150 ppmw to 500 ppmw, from 150 ppmw to 400 ppmw, or from 150 ppmw to 300 ppmw. In embodiments, the plastic derived oil stream 102 may have a concentration of halogen-containing compounds of greater than or equal to 100 ppmw, greater than or equal to 150 ppmw, greater than or equal to 200 ppmw, or even greater than or equal to 250 ppmw.

In embodiments, the plastic derived oil stream 102 may comprise light naphtha range hydrocarbons, jet fuel constituents, diesel range constituents, heavy compounds, or combinations of these. Light naphtha range hydrocarbons refer to hydrocarbons having atmospheric boiling point temperatures of from 0° C. to 150° C., jet fuel constituents include hydrocarbons having atmospheric boiling point temperatures of from 150° C. to 300° C., diesel range constituents include hydrocarbons having atmospheric boiling point temperatures of from 300° C. to 343° C., and the heavy compounds refer to hydrocarbons having atmospheric boiling point temperatures of greater than 343° C. In embodiments, the plastic derived oil stream 102 may comprise from 20 wt. % to 35 wt. % light naphtha range hydrocarbons, such as from 20 wt. % to 30 wt. %, from 20 wt. % to 25 wt. %, or about 23.8 wt. % of the light naphtha range hydrocarbons based on the total weight of the plastic derived oil stream 102. In embodiments, the plastic derived oil stream 102 may comprise from 40 wt. % to 70 wt. % jet fuel constituents, such as from 40 wt. % to 60 wt. %, from 40 wt. % to 55 wt. %, from 40 wt. % to 50 wt. %, from 45 wt. % to 60 wt. %, from 45 wt. % to 55 wt. %, from 45 wt. % to 50 wt. %, or about 49.7 wt. % jet fuel constituents based on the total weight of the plastic derived oil stream 102. In embodiments, the plastic derived oil stream 102 may comprise from 5 wt. % to 25 wt. % of the diesel range constituents, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 15.2 wt. % of the diesel range constituents based on the total weight of the plastic derived oil stream 102. In embodiments, the plastic derived oil stream 102 may comprise from 5 wt. % to 25 wt. % heavy compounds, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 11.3 wt. % heavy compounds based on the total weight of the plastic derived oil stream 102.

In embodiments, the plastic derived oil stream 102 may comprise naphtha range hydrocarbons, middle distillates, heavy compounds, or combinations of these. Naphtha range hydrocarbons refer to hydrocarbons having atmospheric boiling point temperatures of from 25° C. to 221° C., middle distillates include hydrocarbons having atmospheric boiling point temperatures of from 221° C. to 343° C., and the heavy compounds refer to hydrocarbons having atmospheric boiling point temperatures of greater than 343° C. In embodiments, the plastic derived oil stream 102 may comprise from 20 wt. % to 45 wt. % naphtha range hydrocarbons, such as from 20 wt. % to 40 wt. %, from 20 wt. % to 35 wt. %, from 20 wt. % to 30 wt. %, from 30 wt. % to 45 wt. %, from 30 wt. % to 40 wt. %, from 35 wt. % to 45 wt. %, from 35 wt. % to 40 wt. %, or about 38 wt. % naphtha range hydrocarbons based on the total weight of the plastic derived oil stream 102. In embodiments, the plastic derived oil stream 102 may comprise from 40 wt. % to 70 wt. % middle distillates, such as from 40 wt. % to 60 wt. %, from 40 wt. % to 55 wt. %, from 40 wt. % to 50 wt. %, from 45 wt. % to 70 wt. %, from 45 wt. % to 60 wt. %, from 45 wt. % to 55 wt. %, from 45 wt. % to 50 wt. %, or about 48 wt. % middle distillates based on the total weight of the plastic derived oil stream 102. In embodiments, the plastic derived oil stream 102 may comprise from 5 wt. % to 25 wt. % heavy compounds, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 14 wt. % heavy compounds based on the total weight of the plastic derived oil stream 102.

The plastic derived oil stream 102 may be characterized by a boiling point distribution determined using standard test method ASTM D2887. In embodiments, the plastic derived oil stream 102 may have an initial boiling point (IBP) of from 20° C. to 100° C., such as from 20° C. to 60° C., from 20° C. to 50° C., from 25° C. to 100° C. from 25° C. to 60° C., from 25° C. to 50° C., or from 25° C. to 40° C. In embodiments, the plastic derived oil stream 102 may have a final boiling point (FBP) of from 300° C. to 600° C., such as from 300° C. to 500° C., from 300° C. to 450° C., from 350° C. to 600° C., from 350° C. to 500° C., from 350° C. to 450° C., or from 375° C. to 425° C. In embodiments, the plastic derived oil stream 102 may have a 50% boiling point temperature of from 150° C. to 350° C., such as from 150° C. to 300° C., from 150° C. to 275° C., from 200° C. to 350° C., from 200° C. to 300° C., from 200° C. to 275° C., from 225° C. to 350° C., from 225° C. to 300° C., or from 225° C. to 275° C., where the 50% boiling point temperature is the temperature in the boiling point distribution at which 50 wt. % of the constituents of the plastic derived oil stream 102 have transitioned from the liquid phase into the vapor phase.

In embodiments, the plastic derived oil stream 102 may have a density of from 0.65 g/ml to 1.1 g/ml, such as from 0.65 g/ml to 1.0 g/ml, from 0.65 g/ml to 0.9 g/ml, from 0.65 g/ml to 0.8 g/ml, from 0.7 g/ml to 1.1 g/ml, from 0.7 g/ml to 1.0 g/ml, from 0.7 g/ml to 0.9 g/ml, from 0.7 g/ml to 0.8 g/ml, from 0.75 g/ml to 1.1 g/ml, from 0.75 g/ml to 1.0 g/ml, from 0.75 g/ml to 0.9 g/ml, or from 0.75 g/ml to 0.85 g/ml, as determined by ASTM D4052. In embodiments, the plastic derived oil stream 102 may have less than or equal to 0.1 wt. % sulfur, as determined by ASTM D4294. In embodiments, the plastic derived oil stream 102 may have less than 0.01 wt. % Conradson carbon, as determined according to ASTM D4530. In embodiments, the plastic derived oil stream 102 may have an oxygen content of from 100 ppmw to 10,000 ppmw, such as from 100 ppmw to 7,000 ppmw, from 500 ppmw to 10,000 ppmw, from 500 ppmw to 7,000 ppmw, from 1,000 to 10,000 ppmw, from 1,000 to 7,000 ppmw, or from 5,000 ppm to 10,000 ppmw. In embodiments, the plastic derived oil stream 102 may have a moisture content (concentration of water) of less than or equal to 5,000 ppmw, less than or equal to 2,000 ppmw, less than or equal to 1,000 ppmw, less than or equal to 500 ppmw, or less than or equal to 400 ppmw, as determined according to ASTM D6304A. In embodiments, the plastic derived oil stream 102 may have the properties provided in Table 1.

TABLE 1

Properties of an exemplary plastic derived oil stream 102

| Property | Units | Test Method | Value |
|---|---|---|---|
| Density | g/mL | ASTM D4052 | 0.792 |
| Total Oxygen Concentration | ppmw | Combustion based | 5540 |
| Total Chloride Concentration | ppmw | UOP 779 | 342 |
| Total Sulfur | wt. % | ASTM D4294 | 0.064 |
| Total Nitrogen | ppmw | ASTM D4629 | 1135 |
| Bromine Number | $g(Br_2)/100$ g | ASTM D1159 | 43.3 |
| Silica | ppmw | UOP 407 | 0.109 |
| Sodium | ppmw | UOP 407 | 0.174 |
| Iron | ppmw | UOP 407 | 0.097 |
| Water | ppmw | ASTM D6304A | 299 |
| Conradson Carbon Residue | wt. % | ASTM D4530 | <0.01 |

Simulated Distillation Table

| Recovery (wt. %) | Units | Test Method | Temperature |
|---|---|---|---|
| SIMDIST - IBP | °C | ASTM D2887 | 29.4 |
| SIMDIST - 5 wt. % | °C | ASTM D2887 | 77.7 |
| SIMDIST - 10 wt. % | °C | ASTM D2887 | 107.1 |
| SIMDIST - 15 wt. % | °C | ASTM D2887 | 127.3 |
| SIMDIST - 20 wt. % | °C | ASTM D2887 | 139.9 |
| SIMDIST - 25 wt. % | °C | ASTM D2887 | 158.7 |
| SIMDIST - 30 wt. % | °C | ASTM D2887 | 173.6 |
| SIMDIST - 35 wt. % | °C | ASTM D2887 | 188.7 |
| SIMDIST - 40 wt. % | °C | ASTM D2887 | 207.9 |
| SIMDIST - 45 wt. % | °C | ASTM D2887 | 225.6 |
| SIMDIST - 50 wt. % | °C | ASTM D2887 | 240.0 |
| SIMDIST - 55 wt. % | °C | ASTM D2887 | 253.9 |
| SIMDIST - 60 wt. % | °C | ASTM D2887 | 266.2 |
| SIMDIST - 65 wt. % | °C | ASTM D2887 | 279.3 |
| SIMDIST - 70 wt. % | °C | ASTM D2887 | 293.8 |
| SIMDIST - 75 wt. % | °C | ASTM D2887 | 307.1 |
| SIMDIST - 80 wt. % | °C | ASTM D2887 | 320.2 |
| SIMDIST - 85 wt. % | °C | ASTM D2887 | 333.7 |
| SIMDIST - 90 wt. % | °C | ASTM D2887 | 347.8 |
| SIMDIST - 95 wt. % | °C | ASTM D2887 | 364.7 |
| SIMDIST - FBP | °C | ASTM D2887 | 405.3 |

The plastic derived oil stream 102 may be produced from solid waste plastic through melting and dehalogenation followed by pyrolysis. Referring again to FIG. 1, the systems 100 disclosed herein may further include a dehalogenation unit 10 and a pyrolysis reactor 20, both of which may be disposed upstream of the fluidized bed reactor system 110. The dehalogenation unit 10 may be operable to melt solid waste plastic 12 to produce a liquefied plastic stream 14. The liquefied plastic stream 14 may be passed to the pyrolysis reactor 20 downstream of the dehalogenation unit 10. The pyrolysis reactor 20 may be configured to subject the liquefied plastic stream 14 to pyrolysis to produce the plastic derived oil stream 102. The processes disclosed herein may include producing the plastic derived oil stream 102 from a solid waste plastic 12 by liquefying the solid waste plastic 12 in the dehalogenation unit 10 to produce a liquefied plastic stream 14, passing the liquefied plastic stream 14 to the pyrolysis reactor 20, and subjecting the liquefied plastic stream 14 to pyrolysis to produce the plastic derived oil stream 102.

The solid waste plastic 12 supplied to the dehalogenation unit 10 may comprise a plastic feedstock including mixed solid waste plastics of differing compositions. The solid waste plastic 12 may be a mixture of plastics from various polymer families. In embodiments, the solid waste plastics 12 may comprise plastics representative of one or more of the polymer families, such as but not limited to olefins, carbonates, aromatic polymers, sulfones, fluorinated hydrocarbon polymers, chlorinated hydrocarbon polymers, acrylonitriles, or combinations of these families of polymers. In embodiments, the mixed waste plastics 12 may include polyethylenc (PE), polypropylene (PP), diphenylcarbonate, polystyrene (PS), polyether sulfone, polyfluoroethylene (PTFE), polyvinyl chloride (PVC), polyacrylonitrile (PAN), other polymers, or combinations of these. In embodiments, solid waste plastics 12 may be a mixture of high density polyethylene (HDPE, for example, a density of about 0.93 to 0.97 grams per cubic centimeter ($g/cm^3$)), low density polyethylene (LDPE, for example, about 0.910 $g/cm^3$ to 0.940 $g/cm^3$), polypropylene (PP), linear low density polyethylene (LLDPE), polystyrene (PS), polyvinyl chloride (PVC), polyethylene terephthalate (PET), or combinations of these polymers. In embodiments, the solid waste plastics 12 may include one or more chlorinated hydrocarbons, such as PVC. The plastics of the solid waste plastics 12 may be natural, synthetic, or semi-synthetic polymers. Utilization of the solid waste plastics 12 comprising a mixture of different types of plastics and polymers may allow for recycling of solid plastics without fine sorting of the plastics into different types.

The solid waste plastics 12 may be provided in a variety of different forms. In embodiments, the solid waste plastics 12 may be in the form of a powder in smaller scale operations. In embodiments, the solid waste plastics 12 may be in the form of pellets, such as pellets with a particle size of from 1 to 5 millimeter (mm) for larger scale operations. In embodiments, the solid waste plastics 12 may be provided as chopped or ground waste plastics. In embodiments, the system 100 may include a plastic grinding unit (not shown) upstream of the dehalogenation reactor, where the plastic grinding unit may be operable to grind plastic articles into smaller pieces to produce the solid waste plastics 12. In embodiments, the solid waste plastics 12 may comprise waste plastic, manufacturing off-spec product, new plastic products, unused plastic products, or combinations of these.

The dehalogenation unit 10 may be in fluid communication with the solid waste plastics 12 and may be operable to raise the temperature of the solid waste plastics 12 to a temperature between 250° C. and 350° C., such as from 250° C. to 300° C., to melt the plastics and generate the liquefied plastic stream 14. When the solid waste plastics 12 include halogenated plastics, such as but not limited to PVC, melting the plastics may release some hydrogen halides, such as HCl. The dehalogenation unit 10 may also be operable to scrub HCl and other halogen halides released during melting of the solid waste plastics 12. Removal of some of the chlorine, fluorine, or other halides from the solid waste plastic 12 may reduce the concentration of halides in the liquefied plastic stream 14. As a result, the liquefied plastic stream 14 may have a reduced concentration of chlorine and other halogens compared to the solid waste plastic 12. Reducing the concentration of organic halide compounds in the liquefied plastic stream 14 may reduce corrosion problems in the downstream pyrolysis reactor 20. However, the liquefied plastic stream 14 may still contain halogen-containing organic compounds and other contaminants.

In embodiments, the dehalogenation reactor 10 may be operable to increase the temperature of the solid waste plastic 12 to a temperature of from 250° C. to 350° C. to melt the solid waste plastic 12 and remove at least a portion of the chlorine and other halogens from the resulting liquefied plastic stream 14. In embodiments, the dehalogenation reactor 10 may be operable to increase the temperature of the solid waste plastic 12 to a temperature of from 250° C. to 325° C., from 250° C. to 300° C., from 275° C. to 350° C., from 275° C. to 325° C., or from 300° C. to 350° C. The temperature of the dehalogenation reactor 10 may be controlled to remove HCl and melt the solid plastics without cracking a substantial number of C—H or C—C bonds.

In embodiments, the HCl and other hydrogen halides released from the liquefied plastic stream 14 may be passed out of the dehalogenation unit 10 as a halogen-rich stream 16. The halogen-rich stream may include hydrogen halides, such as HCl, as well as hydrogen and light hydrocarbon gases, such as but not limited to mono aromatics, hydrogen, methane, and $C_2$-$C_5$ gases. In embodiments, the halogen-rich stream 16 may be scrubbed with water or a sodium hydroxide solution in a downstream acid gas scrubbing unit (not shown) to remove the halogen compounds from the halogen-rich stream 16. In embodiments, the hydrogen halide compounds may be scrubbed within the dehalogenation unit 10, such as by contacting the released gases with adsorbents, such as but not limited to $Al_2O_3$, zeolites, or other chemical removers. In embodiments, the dehalogenation unit 10 may include a melting reactor and an acid gas scrubber downstream of the melting reactor. In embodiments, a single unit forming the dehalogenation unit 10 may achieve both melting of the plastic solid plastic and scrubbing to remove hydrogen halides. Organic halide compounds not released during dehalogenation in the dehalogenation unit 10 may be passed onward in the liquefied plastic stream 14 to the pyrolysis reactor 20.

Referring again to FIG. 1, the pyrolysis reactor 20 may be disposed downstream of the dehalogenation unit 10 and in fluid communication with the liquefied plastic stream 14 discharged from the dehalogenation unit 10. The pyrolysis reactor 20 may be operable to increase the temperature of the liquefied plastic stream 14 to a temperature of from 300° C. to 1000° C., such as from 350° C. to 1000° C., in an anaerobic environment (no oxygen present), to convert the liquefied plastic stream 14 to the plastic derived oil stream 102. In particular, the pyrolysis of the liquefied plastic stream 14 in the pyrolysis reactor 20 may cause at least a portion of the long chain polymers in the liquefied plastic stream 14 to break apart into smaller fragments comprising organic compounds having smaller average molecular weights compared to the long chain polymers in the liquefied plastic stream 14.

The specific reactor used as the pyrolysis reactor 20 can be of different types and are not limited for the purposes of the present disclosure. Typical reactor types that can be used to serve the function of the pyrolysis reactor 20 can include but are not limited to tank reactors, rotary kilns, packed catalyst bed reactors, bubbling bed reactors, or other types of reactors. In embodiments, the pyrolysis of the liquefied plastic stream 14 in the pyrolysis reactor 20 may be performed in the presence or absence of a pyrolysis catalyst at a temperature of from 300° C. to 1000° C. or from 350° C. to 1000° C. In embodiments, the pyrolysis reactor 20 may operate at a low severity at a temperature less than or equal to 450° C. or at a high severity at a temperature greater than 450° C. In embodiments, the pyrolysis reactor 20 may be operated at a temperature of from 400° C. to 600° C., from 400° C. to 500° C., from 400° C. to 450° C., from 450° C. to 500° C., or from 425° C. to 475° C. In embodiments, the pyrolysis reactor 20 may be operated at a pressure in the range of 1 bar to 100 bars (100 kilopascals (kPa) to 10,000 kPa), from 1 bar to 50 bars (100 kPa to 5000 kPa), from 1 bar to 25 bars (1 kPa to 2500 kPa), or from 1 bar to 10 bars (1 kPa to 1000 kPa). Further, in various embodiments, the residence time of the liquefied plastic stream 14 in the pyrolysis reactor 20 may be from 1 second to 3600 seconds, from 60 seconds to 1800 seconds, or from 60 seconds to 900 seconds. The plastic derived oil stream 102 may be passed out of the pyrolysis reactor 20.

Referring again to FIG. 1, the plastic derived oil stream 102 may be passed to the fluidized bed reactor system 110, such as to the fluidized bed reactor 112. In embodiments, the fluidized bed reactor 112 of the fluidized bed reactor system 110 may be downstream of the pyrolysis reactor 20 and in fluid communication with the pyrolysis reactor 20 to pass the plastic derived oil stream 102 from the pyrolysis reactor 20 to the fluidized bed reactor 112. In embodiments, the plastic derived oil stream 102 may be passed directly from the pyrolysis reactor 20 to the fluidized bed reactor 112. The fluidized bed reactor 112 may comprise the decontamination catalyst 114 of the present disclosure comprising the red mud particles, matrix material, and binder.

Contact of the plastic derived oil stream 102 with the decontamination catalyst 114 at the reaction conditions in the fluidized bed reactor 112 causes reactive adsorption to remove halogen atoms from the plastic derived oil stream 102. In particular, contact of the plastic derived oil stream 102 with the decontamination catalyst 114 at the reaction conditions may cause halogen-containing hydrocarbons to react with the red mud particles of the decontamination catalyst 114 to form hydrogen halides and hydrocarbons, such as through cracking reactions, and then may cause at least a portion of the resulting hydrogen halides to be adsorbed onto the red mud particles, such as by reacting with metal oxides at the surfaces of the red mud particles to produce metal halides coupled to the surfaces of the red mud particles. In the first step of the reactive adsorption, halogen-containing compounds, such as organic halide compounds, react through cracking to decompose into hydrocarbons, such as unsaturated hydrocarbons, and hydrogen halides. The reaction of the halogen-containing compounds to produce hydrocarbons and hydrogen halides may be a cracking reaction facilitated by the combination of a reaction temperature greater than 350° C. and the presence of the decontamination catalyst 114. Chemical reaction 1 (RXN 1) provides an example of decomposition of 2-chloroethylbenzene through cracking to form ethylbenzene and HCl. Generalization of the cracking reaction of organic halide compounds to produce hydrocarbons and hydrogen halides is provided in chemical reaction 2 (RXN 2).

RXN 1

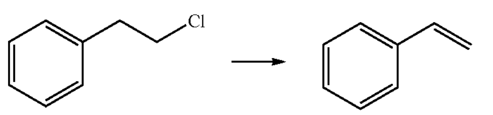

+ HCl

RXN 2

$$R^1—CH_2—CH_2X \longrightarrow R^1—CH{=}CH_2 + HX$$

In RXN 2, R1 can be any organic compound, such as but not limited to a saturated or unsaturated hydrocarbon with or without one or more other functional groups. X is a halogen atom, such as but not limited to fluorine (F), chlorine (Cl), bromine (Br), or iodine (I). Thus, HX represents a hydrogen halide, such as HF, HCl, HBr, or HI. The cracking reactions to decompose the halogen-containing compounds to hydrocarbons and hydrogen halides are irreversible under the reaction conditions in the fluidized bed reactor 112.

In the second step of the reactive adsorption, the hydrogen halides (HX), such as HCl, may further react with the metal oxides of the red mud particles in the decontamination catalyst 114 to produce metal halides, which are adsorbed onto and coupled to the surfaces of the red mud particles. Example reactions of the hydrogen halides (HX) with metal oxides are provided in Reactions 3-5 (RXN 3, RXN 4, RXN 5). In RXN 3, X is the halogen atom and M is a monovalent metal (RXN 3), a divalent metal (RXN 4), or a trivalent metal (RXN 5). The reaction to form the metal halides may be different depending on the valence of the metal in the metal oxide.

RXN 3

$$M_2O + 2HX \longrightarrow 2MX + H_2O$$

RXN 4

$$MO + 2HX \longrightarrow MX_2 + H_2O$$

RXN 5

$$M_2O_3 + 6HX \longrightarrow 2MX_3 + 3H_2O$$

The metal halides coupled to the surfaces of the decontamination catalyst 114 may not be easily desorbed from the decontamination catalyst 114 at the reaction conditions in the fluidized bed reactor 112. Contact of the plastic derived oil stream 102 with the decontamination catalyst 114 may produce the decontaminated plastic derived oil 122 having a reduced concentration of halogen-containing compounds and other contaminants compared to the plastic derived oil stream 102. The concentration of the various hydrocarbon fractions in the decontaminated plastic derived oil 122 may be similar to the concentrations in the plastic derived oil stream 102.

The fluidized bed reactor 112 may include one or a plurality of fluidized bed reactors. When the fluidized bed reactor 112 comprises a plurality of reactors, the plurality of reactors may be arranged in parallel, such as for purposes of increasing capacity of the fluidized bed reactor system 110 for upgrading the plastic derived oil stream 102. In embodiments, the fluidized bed reactor 112 is a fluidized bed reactor in which the plastic derived oil stream 102 and the decontamination catalyst 114 are combined together at one end of the reactor and flow co-currently through the fluidized bed reactor 112 to an outlet of the fluidized bed reactor 112. The fluidized bed reactor 112 may be a riser reactor or a downer reactor. In embodiments, the fluidized bed reactor 112 may be a riser reactor.

As previously discussed, the fluidized bed reactor system 110 includes the decontamination catalyst 114. The decontamination catalyst 114 include red mud, which may be in the form of red mud particles. In embodiments, the decontamination catalyst 114 may comprise from 5 wt. % to 40 wt. % red mud, per unit weight of the decontamination catalyst 114. In embodiments, the decontamination catalyst 114 may further comprise a matrix material and a binder. The decontamination catalyst may comprise from 20 wt. % to 60 wt. % of the matrix material and from 10 wt. % to 30 wt. % of the binder, per unit weight of the decontamination catalyst 114.

Red mud is a waste product from the production of alumina from bauxite through the Bayer process. The red mud includes iron oxides along with other metal oxides, which are randomly distributed throughout the red mud. The iron oxide and other metal oxides are useful for decontamination of the plastic derived oil, such as by removing halogens from the plastic derived oil through reactive adsorption at the reaction conditions in the fluidized bed reactor 112. As previously discussed, reactive adsorption refers to reaction of halogen-containing hydrocarbons, such as chlorine-containing hydrocarbons, to produce hydrocarbon compounds and hydrogen halides (e.g., HCl) followed by further reaction of the hydrogen halides to form metal halides at and attached to the surfaces of the red mud particles. Use of the red mud particles in the decontamination catalyst 114 provides a beneficial use of a waste product.

The metal oxides of the red mud may include metal oxides that promote reaction of halogen-containing hydrocarbon compounds to produce hydrogen halides and hydrocarbon compounds and that adsorb hydrogen halides, such as but not limited to HCl or HF. The metal oxides in the red mud may include oxides of alkali metals, alkaline earth metals, metals in groups 3-13 of the International Union of Pure and Applied Chemistry (IUPAC) periodic table, or combinations of these. In embodiments, the red mud may also include oxides of metalloids, such as oxides of silicon. As used herein, the term “metal oxide” includes metalloid oxides. In embodiments, the red mud may include oxides of iron, aluminum, titanium, calcium, silicon, and sodium. In embodiments, the red mud may comprise $Fe_2O_3$, $Al_2O_3$, CaO, $SiO_2$, and $NaO_2$. In embodiments, the red mud may further include $TiO_2$.

The red mud may include iron oxide ($Fe_2O_3$) as one of the plurality of metal oxides. In embodiments, the red mud may include from 1 wt. % to 70 wt. % $Fe_2O_3$, such as from 1 wt. % to 60 wt. %, from 1 wt. % to 50 wt. %, from 5 wt. % to 60 wt. %, from 5 wt. % to 50 wt. %, from 10 wt. % to 60 wt. %, from 10 wt. % to 50 wt. %, from 15 wt. % to 60 wt. %, or from 15 wt. % to 50 wt. % $Fe_2O_3$ based on the total weight of the red mud in the decontamination catalyst 114.

The red mud may include $Al_2O_3$ (alumina) as one of the plurality of metal oxides. In embodiments, the red mud may include from 1 wt. % to 40 wt. % $Al_2O_3$, such as from 1 wt. % to 30 wt. %, from 1 wt. % to 25 wt. %, from 1 wt. % to 20 wt. %, from 5 wt. % to 30 wt. %, from 5 wt. % to 25 wt. %, from 5 wt. % to 20 wt. %, from 10 wt. % to 30 wt. %, from 10 wt. % to 25 wt. %, or from 10 wt. % to 20 wt. % of the $Al_2O_3$ based on the total weight of the red mud in the decontamination catalyst 114.

The red mud may include $TiO_2$ as one of the plurality of metal oxides. In embodiments, the red mud may include from 0 (zero) wt. % to 15 wt. % $TiO_2$, such as from 0 wt. % to 10 wt. %, from 0 wt. % to 5 wt. %, from 0.1 wt. % to 15 wt. %, from 0.1 wt. % to 10 wt. %, from 0.1 wt. % to 5 wt. %, from 1 wt. % to 15 wt. %, from 1 wt. % to 10 wt. %, from 1 wt. % to 5 wt. %, from 5 wt. % to 15 wt. %, or from 5 wt. % to 10 wt. % of the $TiO_2$ based on the total weight of the red mud in the decontamination catalyst 114.

The red mud may include CaO as one of the plurality of metal oxides. In embodiments, the red mud may include from 1 wt. % to 20 wt. % of the CaO, such as from 1 wt. % to 15 wt. %, from 1 wt. % to 14 wt. %, from 1 wt. % to 10 wt. %, from 2 wt. % to 20 wt. %, from 2 wt. % to 15 wt. %, from 2 wt. % to 14 wt. %, from 2 wt. % to 10 wt. %, from 5 wt. % to 20 wt. %, from 5 wt. % to 15 wt. %, from 5 wt. % to 14 wt. %, or from 5 wt. % to 10 wt. % of the CaO based on the total weight of the red mud in the decontamination catalyst 114.

The red mud may include $Na_2O$ as one of the plurality of metal oxides. In embodiments, the red mud may include from 1 wt. % to 10 wt. % $Na_2O$, such as from 1 wt. % to 7.5 wt. %, from 1 wt. % to 5 wt. %, from 2 wt. % to 10 wt. %, from 2 wt. % to 7.5 wt. %, or from 2 wt. % to 5 wt. % of the $Na_2O$ based on the total weight of the red mud in the decontamination catalyst 114.

The red mud may include $SiO_2$ as one of the plurality of metal oxides. In embodiments, the red mud may include from 3 wt. % to 50 wt. % $SiO_2$, such as from 3 wt. % to 40 wt. %, from 3 wt. % to 30 wt. %, from 5 wt. % to 50 wt. %, from 5 wt. % to 40 wt. %, from 5 wt. % to 30 wt. %, from 10 wt. % to 50 wt. %, from 10 wt. % to 40 wt. %, or from 10 wt. % to 30 wt. % of the $SiO_2$ based on the total weight of the red mud in the decontamination catalyst 114.

In embodiments, the red mud may comprise from 5 wt. % to 60 wt. % $Fe_2O_3$, from 5 wt. % to 30 wt. % $Al_2O_3$, from 0 (zero) wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud.

The red mud may be in the form of red mud particles, which may be characterized by a specific surface area, total pore volume, an average pore size, or any combination thereof. In embodiments, the red mud particles may have a specific surface area of less than 20 meters squared per gram ($m^2/g$), such as less than or equal to 15 $m^2/g$, less than or equal to 14 $m^2/g$, or less than or equal to 13 $m^2/g$. In embodiments, the red mud particles may have a specific surface area of from 1 $m^2/g$ to 20 $m^2/g$, from 1 $m^2/g$ to 15 $m^2/g$, from 1 $m^2/g$ to 14 $m^2/g$, from 1 $m^2/g$ to 13 $m^2/g$, from 5 $m^2/g$ to 20 $m^2/g$, from 5 $m^2/g$ to 15 $m^2/g$, from 5 $m^2/g$ to 14 $m^2/g$, from 5 $m^2/g$ to 13 $m^2/g$, from 10 $m^2/g$ to 20 $m^2/g$, from 10 $m^2/g$ to 15 $m^2/g$, from 10 $m^2/g$ to 14 $m^2/g$, from 10 $m^2/g$ to 13 $m^2/g$, or about 12.5 $m^2/g$. The specific surface area refers to the BET surface area as determined using the Brunauer-Emmett-Teller (BET) method of surface area analysis based on gas adsorption and analysis of gas adsorption isotherms.

In embodiments, the red mud particles may have a total pore volume of less than 0.07 cubic centimeters per gram ($cm^3/g$), such as less than or equal to 0.065 $cm^3/g$ or less than or equal to 0.06 $cm^3/g$. In embodiments, the red mud particles may have a total pore volume of from 0.05 $cm^3/g$ to 0.07 $cm^3/g$, from 0.05 $cm^3/g$ to 0.065 $cm^3/g$, from 0.05 $cm^3/g$ to 0.06 $cm^3/g$, from 0.055 $cm^3/g$ to 0.07 $cm^3/g$, from 0.055 $cm^3/g$ to 0.065 $cm^3/g$, from 0.055 $cm^3/g$ to 0.06

$cm^3/g$, from 0.06 $cm^3/g$ to 0.07 $cm^3/g$, or about 0.06 $cm^3/g$. The total pore volume can be determined through nitrogen physisorption and analysis of nitrogen physisorption isotherms, which is a well-known method. In embodiments, the red mud particles may have an average pore size of greater than 150 nanometers (nm), such as from 150 nm to 250 nm, from 150 nm to 225 nm, from 150 nm to 200 nm, from 170 nm to 250 nm, from 170 nm to 225 nm, from 170 nm to 200 nm, from 180 nm to 250 nm, from 180 nm to 225 nm, from 180 nm to 200 nm, from 190 nm to 200 nm, or about 191 nm. The average pore size can be determined from nitrogen physisorption isotherms using the Barrett-Joyner Halenda (BJH) model, which is a well-known method.

The decontamination catalyst 114 may include an amount of the red mud particles sufficient to remove chloride compounds and other halogen-containing compounds from the plastic derived oil stream 102 in the fluidized bed reactor 112. In embodiments, the decontamination catalyst 114 may have from 5 wt. % to 40 wt. % of the red mud particles per unit weight of the decontamination catalyst 114. In embodiments, the decontamination catalyst 114 may have from 5 wt. % to 35 wt. %, from 5 wt. % to 30 wt. %, from 5 wt. % to 25 wt. %, from 5 wt. % to 22 wt. %, from 5 wt. % to 20 wt. %, from 10 wt. % to 40 wt. %, from 10 wt. % to 35 wt. %, from 10 wt. % to 30 wt. %, from 10 wt. % to 25 wt. %, from 10 wt. % to 22 wt. %, from 10 wt. % to 20 wt. %, from 15 wt. % to 40 wt. %, from 15 wt. % to 35 wt. %, from 15 wt. % to 30 wt. %, from 15 wt. % to 25 wt. %, from 15 wt. % to 22 wt. %, from 15 wt. % to 20 wt. %, or from 15 wt. % to 20 wt. % of the red mud particles per unit weight of the decontamination catalyst 114.

The red mud particles, in the form of a powder or slurry, may be combined with other materials, such as but not limited to binder materials, matrix materials, or other materials, and formed into the decontamination catalyst 114. The combined materials may be extruded to produce the decontamination catalyst 114. In embodiments, decontamination catalyst 114 may be prepared through a spray drying process, which may include forming a precursor slurry comprising the red mud particles, the binder materials, and the matrix materials and then spray drying the precursor slurry to produce the catalyst particles of the decontamination catalyst 114. In embodiments, the decontamination catalyst 114 may be prepared through extrusion and pelletizing or other process for forming composite catalyst particles.

The binder materials may comprise silica, alumina, silica-alumina, or any combinations of these. The alumina may comprise an acid peptized alumina. The silica-alumina may comprise an amorphous silica-alumina. In embodiments, the decontamination catalyst may comprise from 10 wt. % to 30 wt. % of the binder, per unit weight of the decontamination catalyst. For example, the decontamination catalyst may comprise the binder in amounts of from 10 wt. % to 28 wt. %, from 10 wt. % to 25 wt. %, from 10 wt. % to 22 wt. %, from 10 wt. % to 20 wt. %, from 12 wt. % to 30 wt. %, from 12 wt. % to 28 wt. %, from 12 wt. % to 25 wt. %, from 12 wt. % to 22 wt. %, from 12 wt. % to 20 wt. %, from 15 wt. % to 30 wt. %, from 15 wt. % to 28 wt. %, from 15 wt. % to 25 wt. %, from 15 wt. % to 22 wt. %, from 15 wt. % to 20 wt. %, from 18 wt. % to 30 wt. %, from 18 wt. % to 28 wt. %, from 18 wt. % to 25 wt. %, from 18 wt. % to 22 wt. %, from 18 wt. % to 20 wt. %, from 20 wt. % to 30 wt. %, from 20 wt. % to 28 wt. %, from 20 wt. % to 25 wt. %, or any combination of these ranges, per unit weight of the decontamination catalyst. In embodiments, the decontamination catalyst 114 may comprise from 10 wt. % to 30 wt. %, or about 20 wt. %, of the acid peptized alumina binder, per unit weight of the decontamination catalyst 114. The addition of the alumina binder to the decontamination catalyst can improve the dehalogenation efficiency of the decontamination catalyst for dehalogenating the plastic derived oil.

Matrix materials may include clays, such as but not limited to kaolin, montmorillonite, halloysite, bentonite, or combinations of these. In embodiments, the decontamination catalyst 114 may comprise from 20 wt. % to 60 wt. % of the matrix material, per unit weight of the decontamination catalyst. In embodiments, the decontamination catalyst 114 may comprise the matrix material in amounts of from 20 wt. % to 55 wt. %, from 20 wt. % to 50 wt. %, from 20 wt. % to 45 wt. %, from 20 wt. % to 40 wt. %, from 20 wt. % to 35 wt. %, from 25 wt. % to 60 wt. %, from 30 wt. % to 60 wt. %, from 35 wt. % to 60 wt. %, from 40 wt. % to 60 wt. %, from 45 wt. % to 60 wt. %, or any combination of these ranges, per unit weight of the decontamination catalyst. In embodiments, the decontamination catalyst 114 may comprise from 20 wt. % to 60 wt. % kaolin clay per unit weight of the decontamination catalyst 114. In embodiments, the decontamination catalyst 114 may consist of or consist essentially of from 5 wt. % to 40 wt. % red mud particles, from 20 wt. % to 60 wt. % matrix material, and from 10 wt. % to 30 wt. % binder, based on the total weight of the decontamination catalyst 114. The decontamination catalyst 114 may be substantially free of zeolites, such as having less than 1 wt. %, or even less than 0.1 wt. % zeolites based on the total weight of the decontamination catalyst 114, where the zeolites may include USY zeolites, beta zeolites, MFI structured zeolites, or other any other zeolites. In embodiments, the decontamination catalyst 114 does not include any supplemental catalytic species, such as catalytic metals or catalytic metal oxides, intentionally deposited on the surfaces of the decontamination catalyst through a deposition process, such as but not limited to wet impregnation, chemical vapor deposition, or other deposition technique.

The decontamination catalyst 114 comprising the red mud, matrix material, and alumina binder may have properties suitable for use in a fluidized bed reactor, such as having specific surface area, pore volume, and pore size suitable for facilitating interaction with the reactants during fluidized bed conditions and durability sufficient to withstand the conditions and impacts experienced in fluidized bed reactors and catalyst regenerators. The decontamination catalyst 114 may have a specific surface area greater than the specific surface area of the red mud particles. In embodiments, the decontamination catalyst 114 may have a specific surface area of from 20 $m^2/g$ to 50 $m^2/g$, from 20 $m^2/g$ to 40 $m^2/g$, from 20 $m^2/g$ to 35 $m^2/g$, 20 $m^2/g$ to 30 $m^2/g$, from 25 $m^2/g$ to 50 $m^2/g$, from 25 $m^2/g$ to 40 $m^2/g$, from 25 $m^2/g$ to 35 $m^2/g$, from 25 $m^2/g$ to 30 $m^2/g$, or about 29 $m^2/g$, as determined according to the BET method.

The decontamination catalyst 114 may have a total pore volume greater than the total pore volume of the red mud particles. In embodiments, the decontamination catalyst 114 may have a total pore volume of greater than or equal to 0.07 $cm^3/g$, such as greater than or equal to 0.075 $cm^3/g$, or greater than or equal to 0.08 $cm^3/g$. In embodiments, the decontamination catalyst 114 may have a total pore volume of from 0.07 $cm^3/g$ to 0.1 $cm^3/g$, such as from 0.07 $cm^3/g$ to 0.095 $cm^3/g$, from 0.07 $cm^3/g$ to 0.09 $cm^3/g$, from 0.075 $cm^3/g$ to 0.1 $cm^3/g$, from 0.075 $cm^3/g$ to 0.095 $cm^3/g$, from 0.075 $cm^3/g$ to 0.09 $cm^3/g$, from 0.08 $cm^3/g$ to 0.1 $cm^3/g$, from 0.08 $cm^3/g$ to 0.095 $cm^3/g$, from 0.08 $cm^3/g$ to 0.09 $cm^3/g$, or about 0.084 $cm^3/g$. The total pore volume of the decontamination catalyst 114 may be determined from nitrogen physisorption isotherms as previously discussed.

The decontamination catalyst 114 may have an average pore size that is less than the average pore size of the red mud particles. In embodiments, the decontamination catalyst 114 may have an average pore size of from 50 nm to 150 nm, such as from 50 nm to 140 nm, from 50 nm to 130 nm, from 50 nm to 120 nm, from 90 nm to 150 nm, from 90 nm to 140 nm, from 90 nm to 130 nm, from 90 nm to 120 nm, from 100 nm to 150 nm from 100 nm to 140 nm, from 100 nm to 130 nm, from 100 nm to 120 nm, from 110 nm to 150 nm, from 110 nm to 140 nm, from 110 nm to 130 nm, from 110 nm to 120 nm, or about 118 nm, as determined using the BJH method.

The fluidized bed reactor 112 may be configured to contact the plastic derived oil stream 102 with the decontamination catalyst 114 at a reaction temperature of from 350 degrees Celsius (° C.) to 500° C., such as from 350° C. to 450° C., from 350° C. to 400° C., from 400° C. to 500° C., or from 400° C. to 450° C. When the reaction temperature is less than about 350° C., the reaction temperatures may not be sufficient to conduct reactive adsorption. In particular, reactive adsorption requires temperatures greater than about 350° C. in order decompose halogen-containing compounds into hydrocarbons and hydrogen halides (e.g., convert organochlorides into hydrocarbons and HCl) through cracking reactions and then to convert the hydrogen halides to metal halides at the surfaces of the red mud particles in the decontamination catalyst 114. At temperatures less than 350° C., only physisorption of organohalides may predominantly occur. When the temperature is greater than about 500° C., the increased temperature may result in increased thermal cracking of the hydrocarbons in the plastic derived oil stream 102, which may ultimately lead to overcracking the decontaminated plastic derived oil 122 in downstream cracking processes.

The fluidized bed reactor 112 may be configured to contact the plastic derived oil stream 102 with the decontamination catalyst 114 at a pressure of from 101 kilopascals (kPa) to 303 kPa, such as from 125 kPa to 303 kPa, from 150 kPa to 303 kPa, from 200 kPa to 303 kPa, from 250 kPa to 303 kPa, from 101 kPa to 250 kPa, from 101 kPa to 200 kPa, from 101 kPa to 150 kPa, at atmospheric pressure (~101 kPa), or any combination of these ranges. In embodiments, the fluidized bed reactor 112 may be configured to contact the plastic derived oil stream 102 with the decontamination catalyst 114 at a gas hourly space velocity (GHSV) of from 0.2 per hour ($h^{-1}$) to 100 $h^{-1}$, such as from 1 $h^{-1}$ to 100 $h^{-1}$, from 5 $h^{-1}$ to 100 $h^{-1}$, from 10 $h^{-1}$ to 100 $h^{-1}$, from 25 $h^{-1}$ to 100 $h^{-1}$, from 50 $h^{-1}$ to 100 $h^{-1}$, from 0.2 $h^{-1}$ to 80 $h^{-1}$, from 0.2 $h^{-1}$ to 50 $h^{-1}$, from 0.2 $h^{-1}$ to 25 $h^{-1}$, from 0.2 $h^{-1}$ to 10 $h^{-1}$, or any combinations of these ranges. In embodiments, the fluidized bed reactor 112 may be operable to contact the plastic derived oil stream 102 with the decontamination catalyst 114 for a contact time at the reaction temperature of from 0.1 seconds to 60 seconds, such as from 0.1 seconds to 30 seconds, from 0.1 seconds to 20 seconds, from 1 second to 60 seconds, from 1 second to 30 seconds, from 1 second to 20 seconds, from 2 seconds to 60 seconds, from 2 seconds to 30 seconds, from 2 seconds to 20 seconds, from 3 seconds to 60 seconds, from 3 seconds to 30 seconds, from 3 seconds to 20 seconds, from 5 second to 60 seconds, from 5 seconds to 30 seconds, from 5 seconds to 20 seconds, or any combinations of these ranges. The contact time refers to the average duration of time that the hydrocarbons in the plastic derived oil stream 102 are in contact with the decontamination catalyst 114 at the reaction temperature in the fluidized bed reactor 112.

In embodiments, the fluidized bed reactor 112 may be operable to contact the plastic derived oil stream 102 with the decontamination catalyst 114 at a catalyst-to-oil weight ratio of greater than or equal to 2, such as from 2 to 40, from 2 to 35, from 2 to 30, from 2 to 25, from 2 to 20, from 2 to 15, from 2 to 12, from 2 to 10, from 2 to 8, from 4 to 10, from 4 to 40, from 8 to 40, from 15 to 40, from 20 to 40, from 30 to 40, or any combination of these ranges. The catalyst-to-oil weight ratio in the fluidized bed reactor 112 is equal to an average ratio of a mass flow rate of the decontamination catalyst 114 through the fluidized bed reactor 112 divided by a mass flow rate of the plastic derived oil stream 102 in the fluidized bed reactor 112 during steady state operation of the fluidized bed reactor system 100.

The catalyst-to-oil weight ratio in the fluidized bed reactor 112 may be adjusted based on the concentration of halogen-containing compounds in the plastic derived oil stream 102. In particular, the catalyst-to-oil weight ratio in the fluidized bed reactor 112 may be increased in response to greater concentrations of halogen-containing compounds in the plastic derived oil stream 102 and reduced in response to lesser concentrations of halogen-containing compounds in the plastic derived oil stream 102. In embodiments, the processes herein may include adjusting the catalyst-to-oil weight ratio in the fluidized bed reactor 112 based on a concentration of halogen-containing compounds in the plastic derived oil stream 102. Adjusting the catalyst-to-oil weight ratio in the fluidized bed reactor 112 may include determining a concentration of halogen-containing compounds in the plastic derived oil stream 102 and adjusting a mass flow rate of the plastic derived oil stream 102, a mass flow rate of the decontamination catalyst 114, or both to the fluidized bed reactor 112. The catalyst-to-oil weight ratio in the fluidized bed reactor 112 may be adjusted in proportion to the concentration of halogen-containing compounds in the plastic derived oil stream 102.

In embodiments, the decontaminated plastic derived oil 122 may be separated from the used decontamination catalyst 124 at or proximate to an outlet end of the fluidized bed reactor 112. Referring again to FIG. 1, in embodiments, the reaction mixture, which may include the decontaminated plastic derived oil 122 and the used decontamination catalyst 124, may be passed out of the fluidized bed reactor 112 to the fluid-solid separation unit 120. As previously discussed, the fluid-solid separation unit 120 may be disposed at the outlet end of the fluidized bed reactor 112. The fluid-solid separation unit 120 may be configured to separate the decontaminated plastic derived oil 122 from the used decontamination catalyst 124. The decontaminated plastic derived oil 122 is in a fluid phase (generally a vapor phase at the reaction conditions of the fluidized bed reactor 112). In FIG. 1, the fluid-solid separation unit 120 is depicted as a vessel disposed at the outlet end of the fluidized bed reactor 112, where the vessel reduces the fluid velocity in a manner that allows the solid particles of the used decontaminated catalyst 124 to separate and settle out from the fluid phase of the decontaminated plastic derived oil 122. The used decontamination catalyst 124 may settle in the bottom of the fluid-solid separation unit 120, and the decontaminated plastic derived oil 122 may pass out of a top portion of the fluid-solid separation unit 120. In embodiments, the fluid-solid separation unit 120 may further include one or more downstream cyclones, filters, or other unit operation (not shown) that may be configured to remove catalyst fines from the decontaminated plastic derived oil 122. Other types of fluid-solid separation devices are contemplated for the fluid-solid separation unit 120. The used decontamination catalyst 124 may be passed from the fluid-solid separation unit 120 to the catalyst regenerator 130.

Referring again to FIG. 1, as previously discussed, the fluidized bed reactor system 100 includes the catalyst regenerator 130. The used decontamination catalyst 124 may be passed from the fluid-solid separation unit 120 to the catalyst regenerator 130 and regenerated to produce a regenerated decontamination catalyst 132. The regenerated decontamination catalyst 132 may be passed back to the fluidized bed reactor 112 as at least a portion of or all of the decontamination catalyst 114. The catalyst regenerator 130 may be disposed downstream of the solid-fluid separation unit 120 and in fluid communication with an outlet of the solid-fluid separation unit 120 to pass the used decontamination catalyst 124 from the solid-fluid separation unit 120 directly to the catalyst regenerator 130.

During the reactions in the fluidized bed reactor 112, halogen-containing compounds in the plastic derived oil stream 102 react with the red mud particles in the decontamination catalyst 114 to convert the halogen-containing compounds to hydrogen halides and hydrocarbons. The hydrogen halides are then adsorbed onto the surfaces of the red mud particles. Adsorption of the hydrogen halides onto the red mud particles involves further reaction of the hydrogen halides with the metal oxides of the red mud particles to form metal halides at the surfaces of the red mud particles. As an example, when the red mud particles include CaO, adsorption of the HCl onto the red mud particles to form metal halides is illustrated in chemical reaction 6 (RXN 6).

RXN 6

$$CaO + 2HCl \longrightarrow CaCl_2 + H_2O$$

The chemical reaction of HCl with CaO is provided for purposes of illustration, but is not intended to limit the composition of the red mud particles in any way. Depending on the metal oxides present in the red mud particles, the resulting metal halides adsorbed onto the surfaces of the red mud particles can have different thermal stability.

The used decontamination catalyst 124 may have a concentration of halogen-containing compounds, such as metal chlorides or other metal halides, of greater than or equal to 100 ppmw, such as greater than or equal to 120 ppmw, greater than or equal to 140 ppmw, from 100 ppmw to 1000 ppmw, from 100 ppmw to 500 ppmw, from 100 ppmw to 200 ppmw, 120 ppmw to 1000 ppmw, from 120 ppmw to 500 ppmw, from 120 ppmw to 200 ppmw, from 140 ppmw to 1000 ppmw, from 140 ppmw to 500 ppmw, from 140 ppmw to 200 ppmw, based on the total weight of the used decontamination catalyst 124. Also, during the reactions in the fluidized bed reactor 112, coke may also deposit on the used decontamination catalyst 124, such as but not limited to coke resulting from any thermal or catalytic cracking side-reactions.

The catalyst regenerator 130 may be configured to heat the used decontamination catalyst 124 to a temperature sufficient to desorb the halogens from the red mud particles and remove any coke deposited on the used decontamination catalyst 124 to produce the regenerated decontamination catalyst 132. In embodiments, the catalyst regenerator 130 may be configured to contact the used decontamination catalyst 124 with the regeneration gas 134 at the regeneration temperature, which may be sufficient to desorb the halogens from the red mud particles, combust coke deposits on the used decontamination catalyst 124, increase the temperature of the regenerated decontamination catalyst 132, or combinations thereof.

Desorption of the halogens from the red mud particles of the used decontamination catalyst 124 may produce halogen compounds, such as but not limited to halogen gases (such as chlorine gas ($Cl_2$)), hydrogen halides (such as HCl), or combinations of these. The catalyst regenerator 130 may be configured to contact the used decontamination catalyst 124 with a regeneration gas 134, such as a gas containing oxygen, at a regeneration temperature sufficient to convert the metal halides to halogen gases (e.g., $Cl_2$) or hydrogen halides. For instance, the reaction for $CaCl_2$) with oxygen gas to produce chlorine gas and CaO is provided in chemical reaction 7 (RXN 7).

RXN 7

$$2CaCl_2 + O_2 \longrightarrow 2CaO + 2Cl_2$$

Similar reactions may occur with other metal halides on the surfaces of the red mud particles. Without being bound by any particular theory, it is believed that the increased temperature in the catalyst regenerator 130 and contact with the regeneration gas 134 may cause the metal halides at the surface of the red mud particles to become unstable, leading to conversion of the metal halides back to halogen gases or hydrogen halides and removal of the halogen gases or hydrogen halides from the decontamination catalyst.

The regeneration temperature in the catalyst regenerator 130 may also be sufficient to combust the coke deposits, increase the temperature of the catalyst particles, or both to produce the regenerated decontamination catalyst 132. The regeneration gas 134 may be an oxygen-containing gas, such as but not limited to air. In embodiments, the regeneration gas 134 may include a fuel gas in addition to the oxygen-containing gas. The fuel gas may be added to increase the heat produced in the catalyst regenerator 130, which can increase combustion of coke deposits, further increase the temperature of the regenerated decontamination catalyst 132, or both. In embodiments, the regeneration gas 134 does not include any fuel gases and includes only the oxygen-containing gas.

In embodiments, the regeneration temperature in the catalyst regenerator 130 may be greater than the operating temperature of the fluidized bed reactor 112. In embodiments, the regeneration temperature in the catalyst regenerator 130 may be from 500° C. to 900° C., such as from 500° C. to 800° C., from 500° C. to 750° C., from 550° C. to 900° C., from 550° C. to 800° C., or from 550° C. to 750° C.

Combustion gases produced through combustion of the coke deposits, and optionally any supplemental fuels added to the catalyst regenerator 130, may be passed out of the catalyst regenerator 130 in a flue gas 136. The flue gas 136 may also carry the halogen gases and hydrogen halides desorbed from the red mud particles out of the catalyst regenerator 130. The flue gas 136 may exit from a top portion of the catalyst regenerator 130. The flue gas 136 comprising the halogen compounds (e.g., $Cl_2$, HCl, or other halogen-containing gases) and combustion gases may be passed to one or more downstream treatment systems for proper handling of the halogen gases, hydrogen halides, and combustion gases to reduce environmental impact, such as through acid gas removal systems, scrubbing, carbon capture, and the like.

The removal of the halogens, such as but not limited to chlorine, and coke deposits from the used decontamination catalyst 124 produces the regenerated decontamination catalyst 132. The regenerated decontamination catalyst 132 may have a concentration of halogens less than the concentration of halogens in the used decontamination catalyst 124. In embodiments, the regenerated decontamination catalyst 132 may have a concentration of halogens of less than or equal to 10 parts per million by weight (ppmw), such as less than or equal to 5 ppmw, less than or equal to 1 ppmw, less than or equal to 0.1 ppmw, from 0.001 ppmw to 10 ppmw, from 0.001 ppmw to 5 ppmw, from 0.001 ppmw to 1 ppmw, or from 0.001 ppmw to 0.1 ppmw. Referring again to FIG. 1, the catalyst regenerator 130 may be in fluid communication with the inlet end of the fluidized bed reactor 112 to pass the regenerated decontamination catalyst 132 back to the fluidized bed reactor 112. The system 100 may further include a regenerated decontamination catalyst transfer line 138 fluidly coupling the catalyst regenerator 130 and the inlet of the fluidized bed reactor 112. The regenerated decontamination catalyst transfer line 138 may be operable to pass the regenerated decontamination catalyst 132 from the catalyst regenerator 130 to the fluidized bed reactor 112. In embodiments, the system 100 may further include a catalyst valve 140 disposed in the regenerated decontamination catalyst transfer line 138 and operable to control a mass flow rate of the regenerated decontamination catalyst 132 from the catalyst regenerator 170 to the fluidized bed reactor 112.

The decontaminated plastic derived oil 122 may have a concentration of halogen-containing compounds less than the plastic derived oil stream 102 upstream of the fluidized bed reactor 112. In embodiments, the decontaminated plastic derived oil 122 may have a concentration of halogen-containing compounds of less than or equal to 100 ppmw, such as less than or equal to 60 ppmw, less than or equal to 20 ppmw, less than or equal to 15 ppmw. In embodiments, the decontaminated plastic derived oil 122 may have a concentration of halogen-containing compounds of from 0.01 ppmw to 100 ppmw, from 0.01 ppmw to 80 ppmw, from 0.01 ppmw to 60 ppmw, from 0.01 ppmw to 20 ppmw, from 0.01 ppmw to 15 ppmw, from 0.1 ppmw to 100 ppmw, from 0.1 ppmw to 80 ppmw, from 0.1 ppmw to 60 ppmw, from 0.1 ppmw to 20 ppmw, from 0.1 ppmw to 15 ppmw, from 1 ppmw to 100 ppmw, from 1 ppmw to 80 ppmw, from 1 ppmw to 60 ppmw, from 1 ppmw to 20 ppmw, from 1 ppmw to 15 ppmw, from 5 ppmw to 100 ppmw, from 5 ppmw to 80 ppmw, from 5 ppmw to 60 ppmw, from 5 ppmw to 20 ppmw, or from 5 ppmw to 15 ppmw, or any combinations of these ranges, based on the unit weight of the decontaminated plastic derived oil 122.

The decontaminated plastic derived oil 122 may comprise fuel gases, light olefins, $C_2$-$C_4$ alkanes, light aromatic compounds, light naphtha, jet fuel constituents, diesel constituents, heavy compounds, or any combination of these constituents. For purposes of the present disclosure, the terms "light naphtha range hydrocarbons" and "light naphtha" refer to hydrocarbons having boiling point temperatures of from 0° C. to 150° C., the terms "jet fuel constituents" and "jet fuel" refers to hydrocarbons having boiling point temperatures of from 150° C. to 300° C., the terms "diesel" and "diesel constituents" refers to hydrocarbons having boiling point temperatures of from 300° C. to 343° C., and the term "heavy compounds" refers to hydrocarbons having boiling point temperatures greater than 343° C. The decontaminated plastic derived oil 122 may have concentrations of each of jet fuel, diesel constituents, and heavy compounds that are about the same or slightly greater than the concentrations of each of the jet fuel, diesel constituents, and heavy compounds in the plastic derived oil stream 102. The decontaminated plastic derived oil 122 may have a reduced concentration of light naphtha with a corresponding increase in formation of light gases and $C_1$-$C_4$ hydrocarbons compared to the plastic derived oil stream 102. At least a small portion of the plastic derived oil stream 102 may be converted to coke formed on the used decontamination catalyst 124.

In embodiments, the decontaminated plastic derived oil 122 may comprise constituents having boiling point temperatures less than or equal to 0° C., such as but not limited to light gases ($H_2$, $CH_4$), $C_2$-$C_4$ hydrocarbons (paraffins and olefins). A yield of constituents having boiling point temperatures less than or equal to 0° C. in the decontaminated plastic derived oil 122 may be less than or equal to 10 wt. %, such as less than or equal to 8 wt. %, less than or equal to 7 wt. %, less than or equal to 5 wt. %, from greater than 0 (zero) wt. % to 10 wt. %, from 0 wt. % to 8 wt. %, from 0 wt. % to 7 wt. %, from 0 wt. % to 5 wt. %, from 0.1 wt. % to 10 wt. %, from 0.1 wt. % to 8 wt. %, from 0.1 wt. % to 7 wt. %, from 0.1 wt. % to 5 wt. %, from 1 wt. % to 10 wt. %, from 1 wt. % to 8 wt. %, from 1 wt. % to 7 wt. %, from 1 wt. % to 5 wt. %, or from 5 wt. % to 10 wt. % based on the mass flow rate of the plastic derived oil 102 introduced to the fluidized bed reactor 112. The yield of a constituent in the decontaminated plastic derived oil 122 may be equal to 100 times the mass flow rate of the constituent in the decontaminated plastic derived oil 122 divided by the total mass flow rate of the plastic derived oil stream 102 introduced to the fluidized bed reactor 112. In embodiments, the decontaminated plastic derived oil 122 may comprise less than or equal to 10 wt. %, such as less than or equal to 8 wt. %, less than or equal to 7 wt. %, less than or equal to 5 wt. %, from greater than 0 (zero) wt. % to 10 wt. %, from 0 wt. % to 8 wt. %, from 0 wt. % to 7 wt. %, from 0 wt. % to 5 wt. %, from 0.1 wt. % to 10 wt. %, from 0.1 wt. % to 8 wt. %, from 0.1 wt. % to 7 wt. %, from 0.1 wt. % to 5 wt. %, from 1 wt. % to 10 wt. %, from 1 wt. % to 8 wt. %, from 1 wt. % to 7 wt. %, from 1 wt. % to 5 wt. %, or from 5 wt. % to 10 wt. % of the constituents having boiling point temperatures less than or equal to 0° C., based on the total weight of the decontaminated plastic derived oil 122.

In embodiments, a concentration of light naphtha in the decontaminated plastic derived oil 122 may be greater than or equal to 45%, greater than equal to 48%, or even greater than or equal to 50% of the light naphtha concentration in the plastic derived oil stream 102. In embodiments, a yield of light naphtha in the decontaminated plastic derived oil 122 may be from 5 wt. % to 30 wt. %, from 5 wt. % to 25 wt. %, from 5 wt. % to 20 wt. %, from 10 wt. % to 30 wt. %, from 10 wt. % to 25 wt. %, from 10 wt. % to 10 wt. %, from 11 wt. % to 30 wt. %, from 11 wt. % to 25 wt. %, from 11 wt. % to 20 wt. %, from 12 wt. % to 30 wt. %, from 12 wt. % to 25 wt. %, or from 12 wt. % to 20 wt. % based on the mass flow rate of the plastic derived oil stream 102 introduced to the fluidized bed reactor 112. In embodiments, the decontaminated plastic derived oil 122 may comprise from 5 wt. % to 30 wt. %, from 5 wt. % to 25 wt. %, from 5 wt. % to 20 wt. %, from 10 wt. % to 30 wt. %, from 10 wt. % to 25 wt. %, from 10 wt. % to 10 wt. %, from 11 wt. % to 30 wt. %, from 11 wt. % to 25 wt. %, from 11 wt. % to 20 wt. %, from 12 wt. % to 30 wt. %, from 12 wt. % to 25 wt. %, or from 12 wt. % to 20 wt. % light naphtha based on the mass flow rate of the decontaminated plastic derived oil 122.

In embodiments, the decontaminated plastic derived oil 122 may have a concentration of jet fuel constituents that is within 10% or even within 5% by weight of the concentration of the jet fuel constituents in the plastic derived oil stream 102. In embodiments, a yield of jet fuel constituents in the decontaminated plastic derived oil 122 may be from 40 wt. % to 60 wt. %, from 40 wt. % to 55 wt. %, from 45 wt. % to 60 wt. %, from 45 wt. % to 55 wt. %, from 48 wt. % to 60 wt. %, from 48 wt. % to 55 wt. %, from 49 wt. % to 60 wt. %, from 49 wt. % to 55 wt. %, or from 49 wt. % to 52 wt. %, based on the mass flow rate of the plastic derived oil stream 102 introduced to the fluidized bed reactor 112. In embodiments, the decontaminated plastic derived oil 122 may comprise from 40 wt. % to 60 wt. %, from 40 wt. % to 55 wt. %, from 45 wt. % to 60 wt. %, from 45 wt. % to 55 wt. %, from 48 wt. % to 60 wt. %, from 48 wt. % to 55 wt. %, from 49 wt. % to 60 wt. %, from 49 wt. % to 55 wt. %, or from 49 wt. % to 52 wt. % of the jet fuel constituents based on the mass flow rate of the decontaminated plastic derived oil 122.

In embodiments, the decontaminated plastic derived oil 122 may have a concentration of diesel constituents that is within 12% or even within 10% by weight of the concentration of the diesel constituents in the plastic derived oil stream 102. In embodiments, a yield of the diesel constituents in the decontaminated plastic derived oil 122 may be less than or equal to 20 wt. %, such as less than or equal to 18 wt. %, less than or equal to 17 wt. %, from 5 wt. % to 20 wt. %, from 5 wt. % to 18 wt. %, from 5 wt. % to 17 wt. %, from 10 wt. % to 20 wt. %, from 10 wt. % to 18 wt. %, from 10 wt. % to 17 wt. %, from 12 wt. % to 20 wt. %, from 12 wt. % to 18 wt. %, from 12 wt. % to 17 wt. %, from 15 wt. % to 20 wt. %, from 15 wt. % to 18 wt. %, or from 15 wt. % to 17 wt. %, based on the mass flow rate of the plastic derived oil stream 102 introduced to the fluidized bed reactor 112. In embodiments, the decontaminated plastic derived oil 122 may comprise less than or equal to 20 wt. %, such as less than or equal to 18 wt. %, less than or equal to 17 wt. %, from 5 wt. % to 20 wt. %, from 5 wt. % to 18 wt. %, from 5 wt. % to 17 wt. %, from 10 wt. % to 20 wt. %, from 10 wt. % to 18 wt. %, from 10 wt. % to 17 wt. %, from 12 wt. % to 20 wt. %, from 12 wt. % to 18 wt. %, from 12 wt. % to 17 wt. %, from 15 wt. % to 20 wt. %, from 15 wt. % to 18 wt. %, or from 15 wt. % to 17 wt. % of the diesel constituents based on the mass flow rate of the decontaminated plastic derived oil 122.

In embodiments, the decontaminated plastic derived oil 122 may comprise less than or equal to 20 wt. %, less than or equal to 17 wt. %, less than or equal to 15 wt. %, from greater than 0 (zero) wt. % to 20 wt. %, from greater than 0 wt. % to 17 wt. %, from greater than 0 wt. % to 15 wt. %, from 1 wt. % to 20 wt. %, from 1 wt. % to 17 wt. %, from 1 wt. % to 15 wt. %, from 5 wt. % to 20 wt. %, from 5 wt. % to 17 wt. %, from 5 wt. % to 15 wt. %, from 10 wt. % to 20 wt. %, from 10 wt. % to 17 wt. %, or from 10 wt. % to 15 wt. % constituents having boiling point temperatures greater than 300° C., based on the mass flow rate of the decontaminated plastic derived oil 122. In embodiments, a yield of solid coke from the process may be less than or equal to 5 wt. %, less than or equal to 4 wt. %, less than or equal to 3 wt. %, less than or equal to 2 wt. %, less than or equal to 1 wt. %, from greater than 0 (zero) wt. % to 5 wt. %, from greater than 0 wt. % to 4 wt. %, from greater than 0 wt. % to 3 wt. %, from greater than 0 wt. % to 2 wt. %, from 0.01 wt. % to 5 wt. %, from 0.01 wt. % to 4 wt. %, from 0.01 wt. % to 3 wt. %, from 0.01 wt. % to 2 wt. %, or from 0.01 wt. % to 1 wt. % solid coke based on the mass flow rate of the plastic derived oil stream 102 introduced to the fluidized bed reactor 112.

The decontaminated plastic derived oil 122 may be passed from the fluid-solid separation unit 120 to a downstream conversion process, such as but not limited to a fluidized catalytic cracking system, a steam cracking system, a hydrocracking system, or other hydrocarbon conversion system capable of converting hydrocarbons in the decontaminated plastic derived oil 122 into greater value chemicals and intermediates, such as circular chemicals and low carbon fuels.

Referring again to FIG. 1, the system 100 can be used in a process for decontaminating plastic derived oil. The processes for decontaminating the plastic derived oil includes contacting the plastic derived oil stream 102, which comprises the plastic derived oil, with the decontamination catalyst 114 in the fluidized bed reactor 112 at a reaction temperature of from 350° C. to 450° C. to produce the decontaminated plastic derived oil 122 and the used decontamination catalyst 124. The plastic derived oil stream 102 comprises halogen-containing compounds. The decontamination catalyst 114 comprises from 5 wt. % to 40 wt. % red mud particles, from 20 wt. % to 60 wt. % matrix material, and from 10 wt. % to 30 wt. % binder, based on the total weight of the decontamination catalyst 114. Contact of the plastic derived oil stream 102 with the decontamination catalyst 114 at reaction conditions may cause at least a portion of the halogen-containing compounds to react to form hydrocarbons and hydrogen halides, where the hydrogen halides further react with the red mud particles to produce metal halides on surfaces of the red mud particles. The decontaminated plastic derived oil 122 may have a concentration of the halogen-containing compounds less than a concentration of the halogen-containing compounds in the plastic derived oil stream 102. The fluidized bed reactor 112 may be part of the fluidized bed reactor system 110. The fluidized bed reactor system 110 and the fluidized bed reactor 112 may have any of the features, configurations, or operating conditions described in the present disclosure for these features. The decontamination catalyst 114 may have any of the compositions, properties or other characteristic described herein for the decontamination catalyst 114.

The concentration of halogen-containing compounds in the decontaminated plastic derived oil 122 may be less than 100 parts per million by weight (ppmw), such as less than 50 ppmw, or even less than 20 ppmw, based on the mass flow rate of the decontaminated plastic derived oil 122. In embodiments, the hydrocarbons produced through removal of the halogen atoms from the halogen-containing compounds through reactive adsorption remain in the decontaminated plastic derived oil 122. In embodiments, contacting the plastic derived oil stream 102 with the decontamination catalyst 114 may convert less than 10 wt. % of the hydrocarbons in the plastic derived oil stream 102 to hydrocarbons having 4 or less carbon atoms. In embodiments, the decontaminated plastic derived oil 122 may have a concentration of hydrocarbons having less than or equal to 4 carbon atoms of less than 10 wt. %, or even less than 8 wt. %, based on the total weight of the decontaminated plastic derived oil.

Referring again to FIG. 1, the processes disclosed herein may include combining the plastic derived oil stream 102 and the decontamination catalyst 114, such as the regenerated decontamination catalyst 132, at the inlet end of the fluidized bed reactor 112, where the plastic derived oil stream 102 and the decontamination catalyst 114 may be contacted and may travel together through the fluidized bed reactor 112. In embodiments, the processes may include contacting the plastic derived oil stream 102 and the decontamination catalyst 114 in the fluidized bed reactor 112 at a pressure of from 100 kPa to 1000 kPa, from 100 kPa to 303 kPa, or at about atmospheric pressure (i.e., about 101.3 kPa). The processes may include contacting the plastic derived oil stream 102 and the decontamination catalyst 114 in the fluidized bed reactor 112 at a GHSV of from 0.2 $h^{-1}$ to 100 $h^{-1}$.

The plastic derived oil stream 102 and the decontamination catalyst 114 may be introduced to the fluidized bed reactor 112 at a catalyst-to-oil weight ratio of greater than or equal to 2. The catalyst-to-oil weight ratio in the fluidized bed reactor 112 is equal to a mass flow rate of the decontamination catalyst 114 divided by a mass flow rate of the plastic derived oil stream 102 in the fluidized bed reactor 112 during steady state operation. In embodiments, the catalyst-to-oil weight ratio in the fluidized bed reactor 112 may be from 2 to 40, from 2 to 35, from 2 to 30, from 2 to 25, from 2 to 20, from 2 to 15, from 2 to 12, from 2 to 10, from 2 to 8, from 4 to 10, from 4 to 40, from 8 to 40, from 15 to 40, from 20 to 40, from 30 to 40, or any combination of these ranges.

The catalyst-to-oil weight ratio in the fluidized bed reactor 112 may be adjusted based on the concentration of halogen-containing compounds in the plastic derived oil stream 102. Specifically, the catalyst-to-oil weight ratio in the fluidized bed reactor 112 can be increased when the concentration of halogen-containing compounds in the plastic derived oil stream 102 increases and decreased when the concentration of halogen-containing compounds in the plastic derived oil stream 102 decreases. In embodiments, the methods and processes disclosed herein may include adjusting the catalyst-to-oil weight ratio in the fluidized bed reactor 112 based on the concentration of the halogen-containing compounds in the plastic derived oil stream 102. In embodiments, adjusting the weight ratio of catalyst-to-oil in the fluidized bed reactor 112 may include determining a concentration of the halogen-containing compounds in the plastic derived oil stream 102 and adjusting a mass flow rate of the plastic derived oil stream 102 to the fluidized bed reactor 112, a mass flow rate of the decontamination catalyst 114 to the fluidized reactor 112, or both, to adjust the catalyst-to-oil weight ratio. The catalyst-to-oil weight ratio may be adjusted proportionally to the concentration of halogen-containing compounds in the plastic derived oil stream 102.

The processes may further include separating the used decontamination catalyst 124 from the decontaminated plastic derived oil 122 downstream of the fluidized bed reactor 112, regenerating the used decontamination catalyst 124 in the catalyst regenerator 130 to produce a regenerated decontamination catalyst 132, and passing the regenerated decontamination catalyst 132 back to the fluidized bed reactor 112. The processes may include passing the contents of the fluidized bed reactor 112 to the fluid-solid separation unit 120 that separates the contents of the fluidized bed reactor 112 into the decontaminated plastic derived oil 122 and the used decontamination catalyst 124. The decontaminated plastic derived oil 122 may have any of the compositions, properties, or characteristics previously discussed herein for the decontaminated plastic derived oil 122.

The processes of the present disclosure may include passing the used decontamination catalyst 124 to the catalyst regenerator 130, and regenerating the used decontamination catalyst 124 in the catalyst regenerator 130 to produce the regenerated decontamination catalyst 132. The regenerated decontamination catalyst 132 may have a reduced concentration of halogens compared to the used decontamination catalyst 124 prior to regeneration. The regenerated decontamination catalyst 132 may also have reduced coke deposits, greater temperature, or both compared to the used decontamination catalyst 124 prior to regeneration. In embodiments, regenerating the used decontamination catalyst 132 may include contacting the used decontamination catalyst 132 with the regeneration gas 134 at a regeneration temperature sufficient to convert metal halides at the surface of the red mud particles to halogen compounds, such as but not limited to $Cl_2$ and other halogen gases. In embodiments, contacting the used decontamination catalyst 124 with the regeneration gas 134 at the regeneration temperature may cause reaction of the metal halides on the surfaces of the red mud particles to produce halogen-containing gases (e.g., $Cl_2$, HCl, $F_2$, HF, etc.) and the regenerated decontamination catalyst 132. The regeneration temperature may also be sufficient to remove coke deposits from the decontamination catalyst, increase the temperature of the decontamination catalyst, or both. In embodiments, the regeneration gas 134 may be an oxygen-containing gas, such as but not limited to air. In embodiments, regenerating the used decontamination catalyst 132 may include contacting the used decontamination catalyst 132 with the regeneration gas 134 in the catalyst regenerator 130 at the regeneration temperature that is greater than the operating temperature of the fluidized bed reactor 112, such as at a regeneration temperature of from 500° C. to 800° C., from 500° C. to 750° C., from 500° C. to 700° C., from 550° C. to 800° C., from 550° C. to 750° C., from 550° C. to 700° C., from 600° C. to 800° C., from 600° C. to 750° C., from 600° C. to 700° C., or from 650° C. to 800° C.

The processes may further include passing a flue gas 136 out of the catalyst regenerator 130, wherein the flue gas 136 may comprise halogen-containing gases, such as but not limited to $Cl_2$, HCl, $F_2$, HF, or other halogen gas or halogen halide gas. The flue gas 136 may also include unreacted regeneration gases and combustion gases produced from combustion of the coke deposits and any fuel gases added to the catalyst regenerator 130. The processes may include passing the flue gas 136 to a downstream treatment system for properly handling the halogen-containing gases in the flue gas 136. The catalyst regenerator 130 may have any of the other features, configurations, or operating conditions described herein for the catalyst regenerator 130.

The processes may include providing the plastic derived oil stream 102 comprising hydrocarbons and from 10 parts per million by weight (ppmw) to 500 ppmw of halogen-containing compounds based on the total weight of the plastic derived oil stream 102. In embodiments, the processes may include producing the plastic derived oil stream 102 from solid waste plastic. Producing the plastic derived oil stream 102 may include passing solid waste plastic to a dehalogenation unit 10, which melts the solid waste plastic and removes some halogen compounds from the solid waste plastic to produce the liquefied plastic stream 14. The processes may further include passing the liquefied plastic stream 14 to the pyrolysis unit 20 and subjecting the liquefied plastic stream 14 to pyrolysis in the pyrolysis unit 20 to produce the plastic derived oil stream 102.

Referring now to FIG. 2, in embodiments, the system 100 may include one or a plurality of fixed bed reactors 160 containing a fixed catalyst bed 162 comprising the decontamination catalyst 114. The plastic derived oil stream 102 or the treated plastic derived oil 192 may be passed to the fixed bed reactor 160 and contacted with the decontamination catalyst 114 in the fixed catalyst bed 162. The decontaminated plastic derived oil 122 may pass out of the fixed catalyst bed 162 and out of the fixed bed reactor 160. Over time, the decontamination catalyst 114 may become saturated with the metal halides and coke deposits. Periodically, the used decontamination catalyst 114 may be subjected to an in-place regeneration process to remove the metal halides and coke deposits. The in-place regeneration process may include stopping the flow of the plastic derived oil stream 102 to the fixed bed reactor 160, introducing a regeneration gas 164 to the fixed bed reactor 160 for a period of time sufficient to desorb the metal halides and burn off coke from the used decontamination catalyst to produce a regenerated decontamination catalyst in the fixed catalyst bed 162. The halogen-containing gases and combustion products may exit from the fixed bed reactor 160 in a flue gas stream 166.

EXAMPLES

The various embodiments of systems and processes of the present disclosure will be further clarified by the following examples. The examples are illustrative in nature, and should not be understood to limit the subject matter of the present disclosure.

Example 1: Preparation of the Decontamination Catalyst

In Example 1, the decontamination catalyst of the present disclosure was synthesized. The decontamination catalyst comprising the red mud was prepared through a spray drying method. First, 200 grams (g) (dry basis) of kaolin clay powder was mixed with 431.92 g of deionized water to form a kaolin slurry. Separately, 200 g (dry basis) of red mud was mixed with 462.59 g deionized water and stirred for 10 minutes (min) to form a red mud slurry. The red mud particles were obtained from Ma'aden Aluminum Company based in Ras Al Khair, Saudi Arabia, and had a BET surface area of 12.535 $m^2/g$, a total pore volume of 0.06 $cm^3/g$, and an average pore size of 191.125 nm. The kaolin slurry and the red mud slurry were mixed together and stirred for 5 min to produce a red mud-kaolin slurry. Separately, 100 g (dry basis) of Catapal B alumina was mixed with 194.92 g of distilled water to form an alumina slurry and peptized by adding 7.22 g of concentrated formic acid (70 wt. %) and stirred for 30 min. The peptized alumina slurry was added to the red mud-kaolin slurry and stirred for 10 min, producing a slurry with high viscosity where each component remained suspended. The resulting catalyst precursor slurry comprising 30% solids was spray dried to produce catalyst particles having particle sizes of from 20 micrometers (μm) to 100 μm. The catalyst particles were then calcined at 550° C. for 6 hours to produce the decontamination catalyst. The decontamination catalyst had a BET surface area of 28.77 $m^2/g$, a total pore volume of 0.084 $cm^3/g$, and an average pore size of 117.63 nm.

Catalyst Testing

A plastic derived oil produced from solid waste plastic was subjected to deep dechlorination with the decontamination catalyst according to an Advanced Cracking Evaluation (ACE) test procedure. The ACE tests were conducted using a micro-activity cracking testing (MAT) unit. The MAT unit and ACE testing process is described more in detail in U.S. Pat. No. 6,069,012.

Referring to FIG. 3, the MAT unit 200 used in these examples is schematically depicted. The MAT unit 200 includes a fluidized reactor 210 configured to simulate reaction in an FCC reactor or other fluidized bed reactor. Fluidization gas 212 is introduced to the bottom of the fluidized reactor 210 to maintain the catalyst 204 in a fluidized state. The catalyst 204 is loaded into the fluidized reactor 210 from the catalyst hopper 206. The feed 202 is introduced to the top of the fluidized reactor 210 and flows downward into the catalyst 204 fluidized within the fluidized reactor 210. After contacting the feed 202 with the catalyst 204 in the reactor, the reaction effluent 216 is passed out of the fluidized reactor 210 to the product liquid receivers 220, which separate the liquid products from the gaseous products. The gaseous product stream 222 is passed to a product gas receiver 230. The composition of the gaseous product stream 222 is analyzed using a micro gas chromatograph 240 having a GC control unit 242. The catalyst 204 is regenerated by introducing a regeneration gas 214 into the bottom of the fluidized reactor 210. The flue gas is treated in a catalytic converter 260 and passed through a flow meter 262 and $CO_2$ analyzer 264 for quantifying the amount of coke produced during the reactions. The MAT unit 200 can include an ACE control system 270 for controlling operation of the MAT unit 200.

Examples 2-5: Decontamination Catalyst Testing

For Examples 2-5, the decontamination catalyst of Example 1 was subjected to ACE testing in the MAT unit as previously described. For the current examples, the ACE testing for the decontamination catalyst was performed using steam-deactivated catalyst. The decontamination catalysts were first deactivated under hydrothermal conditions (100% steam, 810° C., 6 h) before being used for catalytic evaluations. The ACE testing was performed with a catalyst-to-oil weight ratio of 4 and an injection time of 75 seconds. The ACE testing of the decontamination catalyst in the MAT unit was conducted at temperatures of 350° C., 400° C., 450° C., and 500° C.

Prior to each experiment, the steam-deactivated decontamination catalyst was loaded into the reactor and heated to the desired reaction temperature. $N_2$ gas was fed through the feed injector from the bottom to keep the decontamination catalyst particles fluidized. Once the catalyst bed temperature reached within +2° C. of the reaction temperature, the reaction was started by injecting the feed (i.e., the plastic derived oil). For each evaluation, the feed was injected for a predetermined time (time-on-stream (TOS)) of 75 seconds. The desired catalyst-to-feed ratio of 4 was maintained by controlling the feed pump for the feed. The composition of the plastic derived oil stream, which was used as the feed for Examples 2-5, is provided in Table 2. The gaseous product was routed to the liquid receiver (220 in FIG. 3), where $C_{5+}$ hydrocarbons were condensed. The remaining product gases were routed to the gas receiver (230 in FIG. 3) in the product gas stream 222. The used decontamination catalyst in the reactor was then stripped with a stripping gas ($N_2$) to removing any residual liquid or gaseous products, reactants, or both from the decontamination catalyst. The stripping gases and residual products were also passed to the gas receiver (230 in FIG. 3). After catalyst stripping was completed, the reactor was heated to 700° C., and air injected to regenerate the used decontamination catalyst to produce regenerated decontamination catalyst. During regeneration, the released gas was routed to an analyzer (catalytic converter 260, flow meter 262 and $CO_2$ analyzer 264 in FIG. 3).

Coke yield was calculated from the flue gas flow rate and $CO_2$ concentration. The chloride content of the used decontamination catalyst is determined through ion chromatography analysis conducted after stripping and before regeneration.

The gaseous product stream 222 was analyzed by an online gas chromatography system (Agilent 7890 gas chromatograph) equipped with both FID and TCD detectors. The liquid product stream is analyzed according to the offline analytical test methods. In particular, the liquid product stream is analyzed by simulated distillation according to test method EN 15199-2 using the Agilent 7890 gas chromatograph and naphtha analysis techniques.

For the simulated distillation, the analysis was conducted for five distillation fractions: (1) light hydrocarbon gases having 1-4 carbon atoms; (2) a light naphtha fraction having a boiling point range of from 0° C. to 150° C.; (3) a jet fuel fraction having a boiling point range of from 150° C. to 300° C.; (4) a diesel fraction having boiling point temperatures of from 300° C. to 343° C.; and (5) a heavy compounds fraction comprising liquids having boiling point temperatures greater than 343° C. The light hydrocarbon gases were further classified into fuel gas (hydrogen and methane), $C_2$-$C_4$ paraffins, ethylene (C2=), propylene (C3=), and mixed butenes (C4=). Coke was quantified after passing an air stream through the MAT unit at high temperatures to burn the coke into a mixture of carbon monoxide, carbon dioxide, and water, as previously discussed, and then passing the combustion gases through a $CO_2$ analyzer, which included a calibrated infrared analyzer. The composition of the plastic derived oil stream 102 used as the feed and the reaction products for Examples 2-5 are provided in Table 2 and in FIG. 4.

of the plastic derived oil with the decontamination catalyst does result in some conversion of hydrocarbons to light hydrocarbons having less than 4 carbons and hydrogen.

The total amount of constituents boiling above 150° C. (jet fuel, diesel, and heavy components) was relatively unchanged or slightly increased from the starting plastic derived oil. The yield of jet fuel constituents was within 5% of the concentration of the jet fuel constituents in the plastic derived oil. The contacting resulted in slight increases in the yields of diesel and heavy compounds (343+° C.) compared to the starting plastic derived oil. Overall, the contacting of the plastic derived oil with the decontamination did not have a great impact on the underlying hydrocarbon composition of the decontaminated plastic derived oil compared to the starting plastic derived oil. Without intending to be bound by any particular theory, it is believed that the increase in the yields of diesel and heavy compounds compared to the starting plastic derived oil may result from oligomerization of olefin compounds in the plastic derived oil to form larger molecules, particularly with the reduced cracking resulting from the nature of the decontamination catalyst and the reduced temperatures.

Figure 5:
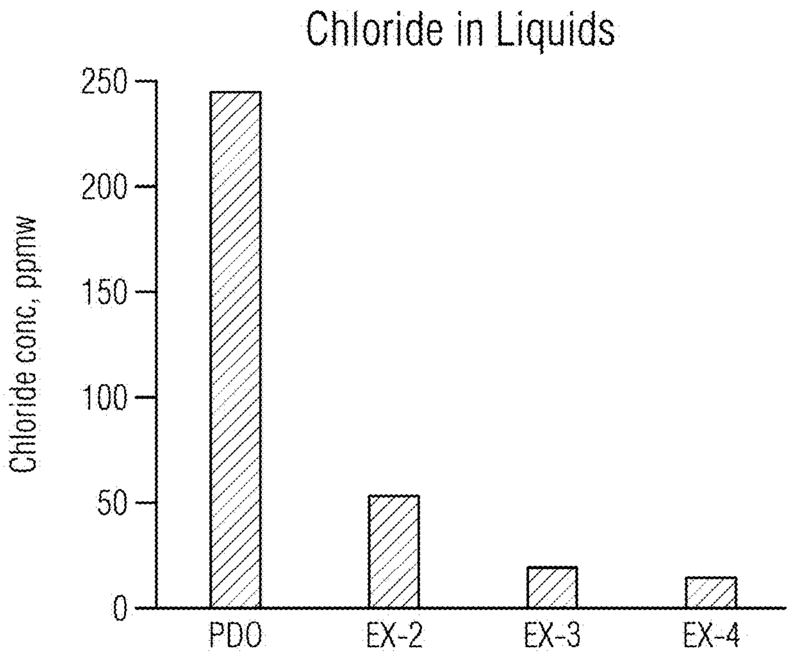
FIG. 5 graphically depicts chloride concentration in used decontamination catalysts produced through contacting a decontamination catalyst with the plastic derived oil stream at various reaction conditions, according to embodiments shown and described in this disclosure.

Additionally, the plastic derived oil and the reaction products of Examples 2-4 were analyzed for concentration of chloride compounds using X-Ray Fluorescence (XRF) spectroscopy according to known methods. The concentrations of chloride compounds in the plastic derived oil and in the reaction products of Examples 2-4 are provided in FIG. 5 and in Table 2. As shown in Table 2, the plastic derived oil stream had a chloride content of 245 ppmw. After contact with the decontamination catalyst, the reaction products of Example 2 (reaction temperature of 350° C.) had a chloride concentration of 52.18 ppmw. Further increasing the reaction temperature increased the removal of chlorides from the plastic derived oil as shown by the decreasing chloride concentration in the decontaminated plastic derived oils in Examples 3 and 4, respectively. As shown by the results presented herein, the decontamination catalyst comprising red mud is effective at removing halogen atoms from the plastic derived oil. The reactor set up in this disclosure allows for the continuous decontamination of plastic derived oil to produce a decontaminated plastic derived oil having a reduced concentration of halogen-containing compounds.

TABLE 2

ACE Testing of Decontamination Catalysts of Examples 2-5

| Constituent | Plastic derived oil | 2 | 3 | 4 | 5 |
|---|---|---|---|---|---|
| Reaction Temperature (°C) | — | 350 | 400 | 450 | 500 |
| Catalyst | — | Example 1 | Example 1 | Example 1 | Example 1 |
| Fuel Gas (wt. %) | — | 0.64 | 0.42 | 0.30 | 0.35 |
| C2-C4 paraffin (wt. %) | — | 1.63 | 0.97 | 0.63 | 0.65 |
| Ethylene (wt. %) | — | 0.98 | 0.72 | 0.60 | 0.70 |
| Propylene (wt. %) | — | 3.00 | 1.80 | 1.13 | 1.04 |
| Butenes (wt. %) | — | 2.92 | 1.78 | 1.14 | 1.07 |
| Light Naphtha (wt. %) | 23.8 | 11.72 | 12.16 | 13.21 | 16.23 |
| Jet Fuel (wt. %) | 49.7 | 49.05 | 49.50 | 50.83 | 51.02 |
| Diesel (wt. %) | 15.2 | 16.23 | 16.74 | 16.69 | 15.72 |
| Heavy Compounds (wt. %) | 11.3 | 12.31 | 14.81 | 14.33 | 11.86 |
| Coke (wt. %) | — | 1.53 | 1.11 | 1.13 | 1.36 |
| Chloride - effluent (ppmw) | 245 | 52.18 | 19.23 | 14.48 | * |
| Chloride - used catalyst (ppmw) | — | 146 | 172 | 184 | * |

* Chloride contents in the effluent and used catalyst were not measured for Example 5

Figure 4:
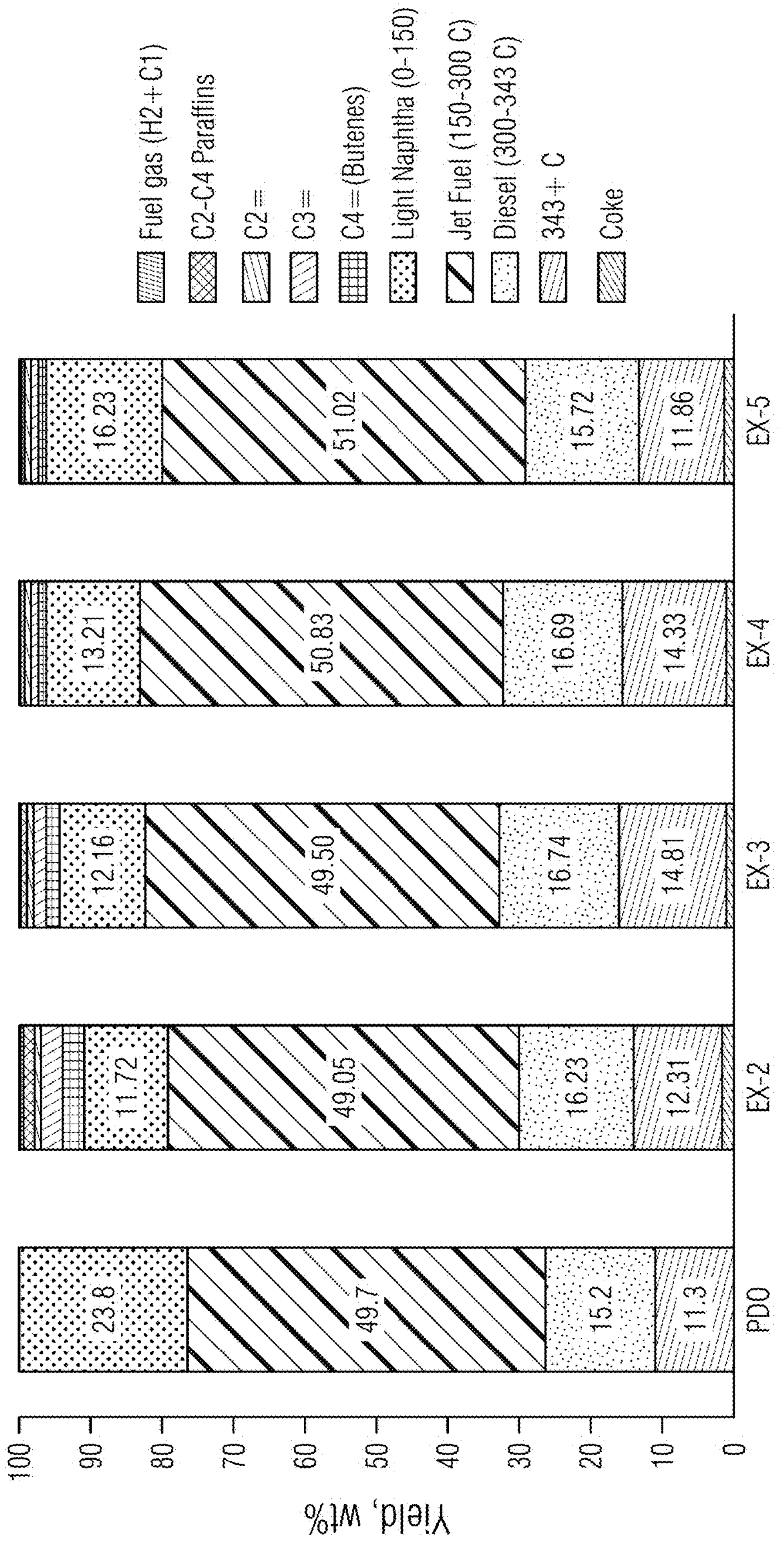
FIG. 4 graphically depicts chloride concentration of a plastic derived oil stream and decontaminated plastic derived oils produced using the decontamination catalyst, according to embodiments shown and described in this disclosure.
Figure 6:
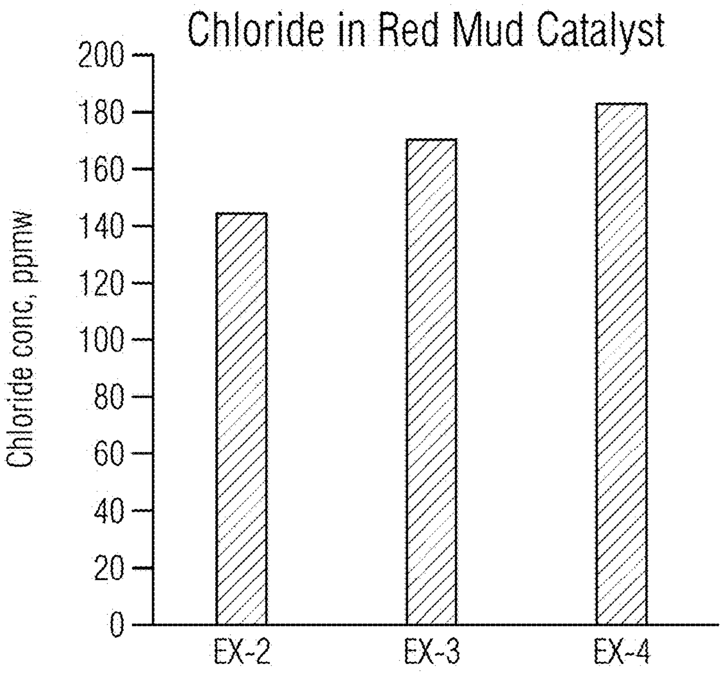
FIG. 6 graphically depicts a composition of the plastic derived oil stream and decontaminated plastic derived oil obtained from contacting the plastic derived oil stream with the decontamination catalyst at different reaction temperatures, according to embodiments shown and described in this disclosure.

Referring to FIG. 4 and Table 2, contacting the plastic derived oil with the decontamination catalyst resulted in some conversion of light naphtha to light olefins ($C_2$-$C_4$ olefins), fuel gas, and other hydrocarbons having from 1 to 4 carbon atoms, as shown by the increase in light olefins, fuel gas, and light hydrocarbons and the decrease in light naphtha compared to the starting plastic derived oil (PDO). The total yield of fuel gas, light olefins, and hydrocarbons having from 1 to 4 carbon atoms was less than about 10% for Examples 2 and 3, and even less than 5% for Examples 4 and 5. The yields of light naphtha in the decontaminated plastic derived oil streams were greater than 49% of the light naphtha in the starting plastic derived oil. Thus, the contact The used contamination catalyst for Examples 2, 3, and 4 were analyzed for chloride content through ion chromatography analysis. The ion chromatography analysis of the used contamination catalysts was conducted after stripping the catalyst and before regeneration. Referring now to FIG. 6 and Table 2, the chloride content in the used decontamination catalysts for Examples 2-4 confirmed the formation of the metal chlorides on the surfaces of the red mud particles in the decontamination catalysts. As shown in FIG. 6, the chloride content in the used decontamination catalyst increases with increasing reactor temperature.

A first aspect of the present disclosure may be directed to a process for decontaminating a plastic derived oil. The process may comprise contacting a plastic derived oil stream with a decontamination catalyst in a fluidized bed reactor at a reaction temperature of from 350° C. to 450° C. to produce a decontaminated plastic derived oil and a used decontamination catalyst. The plastic derived oil stream comprises halogen-containing compounds. The decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst. The contacting the plastic derived oil stream with the decontamination catalyst at the reaction conditions causes at least a portion of the halogen-containing compounds to react to form hydrocarbons and hydrogen halides, where the hydrogen halides further react with the red mud particles to produce metal halides on surfaces of the red mud particles. The decontaminated plastic derived oil has a concentration of the halogen-containing compounds less than a concentration of the halogen-containing compounds in the plastic derived oil stream.

A second aspect of the present disclosure may include the first aspect, where the concentration of halogen-containing compounds in the decontaminated plastic derived oil may be less than 100 parts per million by weight (ppmw) based on the mass flow rate of the decontaminated plastic derived oil, such as less than 50 ppmw, or even less than 20 ppmw.

A third aspect of the present disclosure may include either one of the first or second aspects, where the hydrocarbons produced through removal of the halogen atoms through reactive adsorption remain in the decontaminated plastic derived oil.

A fourth aspect of the present disclosure may include any one of the first through third aspects, where the contacting the plastic derived oil stream with the decontamination catalyst may convert less than 10 wt. % of the hydrocarbons in the plastic derived oil stream to hydrocarbons having 4 or less carbon atoms.

A fifth aspect of the present disclosure may include any one of the first through fourth aspects, where the decontaminated plastic derived oil may have a concentration of hydrocarbons having less than or equal to 4 carbon atoms of less than 10 wt. %, or less than 8 wt. %, based on the total weight of the decontaminated plastic derived oil.

A sixth aspect of the present disclosure may include any one of the first through fifth aspects, where the fluidized bed reactor may be a riser reactor or a downer reactor.

A seventh aspect of the present disclosure may include any one of the first through sixth aspects, comprising contacting the plastic derived oil stream with the decontamination catalyst in the fluidized bed reactor at a pressure of from 100 kPa to 1000 kPa, and at a catalyst-to-oil weight ratio of from 2 to 40, wherein the catalyst-to-oil weight ratio in the fluidized bed reactor is equal to a mass flow rate of the decontamination catalyst divided by a mass flow rate of the plastic derived oil stream in the fluidized bed reactor at steady state.

An eighth aspect of the present disclosure may include the seventh aspect, further comprising adjusting the catalyst-to-oil weight ratio in the fluidized bed reactor based on the concentration of the halogen-containing compounds in the plastic derived oil stream.

A ninth aspect of the present disclosure may include the eighth aspect, where adjusting the catalyst-to-oil weight ratio in the fluidized bed reactor may comprise determining a concentration of the halogen-containing compounds in the plastic derived oil stream upstream of the fluidized bed reactor; and adjusting a mass flow rate of the plastic derived oil stream to the fluidized bed reactor, a mass flow rate of the decontamination catalyst to the fluidized bed reactor, or both, where the catalyst-to-oil weight ratio may be adjusted in proportion to the concentration of the halogen-containing compounds in the plastic derived oil stream.

A tenth aspect of the present disclosure may include any one of the first through ninth aspects, further comprising separating the used decontamination catalyst from the decontaminated plastic derived oil, regenerating the used decontamination catalyst in a catalyst regenerator to produce a regenerated decontamination catalyst, and passing the regenerated decontamination catalyst back to the fluidized bed reactor.

An eleventh aspect of the present disclosure may include the tenth aspect, where regenerating the used decontamination catalyst may comprise contacting the used decontamination catalyst with a regeneration gas in the catalyst regenerator, where the regeneration gas may be an oxygen-containing gas.

A twelfth aspect of the present disclosure may include the eleventh aspect, comprising contacting the used decontamination catalyst with the regeneration gas at a regeneration temperature of from 500° C. to 800° C.

A thirteenth aspect of the present disclosure may include the twelfth aspect, where the contacting the used decontamination catalyst with the regeneration gas at the regeneration temperature may cause reaction of the metal halides on the surfaces of the red mud particles to produce halogen-containing gases and regenerated decontamination catalyst.

A fourteenth aspect of the present disclosure may include either one of the twelfth or thirteenth aspects, further comprising passing a flue gas out of the catalyst regenerator, where the flue gas may comprise the halogen-containing gases.

A fifteenth aspect of the present disclosure may include any one of the twelfth through fourteenth aspects, where the contacting the used decontamination catalyst with the regeneration gas at the regeneration temperature may cause combustion of coke deposits on the used decontamination catalyst.

A sixteenth aspect of the present disclosure may include any one of the first through fifteenth aspects, further comprising producing the plastic derived oil stream from solid waste plastic.

A seventeenth aspect of the present disclosure may include the seventeenth aspect, wherein producing the plastic derived oil stream may comprise liquefying the solid plastic waste in a dehalogenation reactor to produce a liquefied plastic stream having a concentration of halogen compounds less than the solid plastic waste; passing the liquefied plastic stream to a pyrolysis reactor downstream of the dehalogenation reactor; and subjecting the liquefied plastic stream to pyrolysis in the pyrolysis reactor to produce the plastic derived oil stream.

An eighteenth aspect of the present disclosure may include any one of the first through seventeenth aspects, where the red mud particles may comprise $Fe_2O_3$, $Al_2O_3$, CaO, $SiO_2$, and $NaO_2$.

A nineteenth aspect of the present disclosure may include the eighteenth aspect, where the red mud particles further may comprise $TiO_2$.

A twentieth aspect of the present disclosure may include any one of the first through nineteenth aspects, where the red mud particles may comprise from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud particles.

A twenty-first aspect of the present disclosure may include any one of the first through twentieth aspects, where the matrix material may be kaolin clay and the binder may be alumina.

A twenty-second aspect of the present disclosure may include the twenty-first aspect, where the alumina may be peptized alumina.

A twenty-third aspect of the present disclosure may include any one of the first through twenty-second aspects, where the decontamination catalyst may have a specific surface area greater than a specific surface area of the red mud particles, where the specific surface area is determined according to the Brunauer-Emmett-Teller (BET) method.

A twenty-fourth aspect of the present disclosure may include any one of the first twenty-third second aspects, where the decontamination catalyst may have a specific surface area of from 20 $m^2/g$ to 50 $m^2/g$, as determined according to the BET method.

A twenty-fifth aspect of the present disclosure may include any one of the first through twenty-fourth aspects, where the decontamination catalyst may have a total pore volume greater than a total pore volume of the red mud particles.

A twenty-sixth aspect of the present disclosure may include any one of the first through twenty-fifth aspects, where the decontamination catalyst may have a total pore volume of from 0.07 $cm^3/g$ to 0.1 $cm^3/g$.

A twenty-seventh aspect of the present disclosure may include any one of the first through twenty-sixth aspects, where the decontamination catalyst may have an average pore size less than an average pore size of the red mud particles.

A twenty-eighth aspect of the present disclosure may include any one of the first twenty-seventh aspects, where the decontamination catalyst may have an average pore size of from 100 nm to 150 nm.

A twenty-ninth aspect of the present disclosure may include any one of the first through twenty-eighth aspects, where the decontamination catalyst may have an average particle size of from 10 μm to 200 μm.

A thirtieth aspect of the present disclosure may be directed to a system for upgrading plastic derived oil. The system may include a fluidized bed reactor containing a decontamination catalyst, where the decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst. The fluidized bed reactor is configured to contact a plastic derived oil stream with the decontamination catalyst to produce decontaminated plastic derived oil. The system may further include a fluid-solid separation unit disposed at an outlet end of the fluidized bed reactor, where the fluid-solid separation unit may be configured to separate the decontaminated plastic derived oil from a used decontamination catalyst. The system may further include a catalyst regenerator disposed downstream of the fluid-solid separation unit, where the catalyst regenerator may be configured to regenerate the used decontamination catalyst to produce a regenerated decontamination catalyst. The catalyst regenerator may be in fluid communication with the fluidized bed reactor to pass the regenerated decontamination catalyst back to the fluidized bed reactor.

A thirty-first aspect of the present disclosure may the thirtieth aspect, where the system further may comprise the plastic derived oil stream comprising the plastic derived oil, where the plastic derived oil stream may have a concentration of halogen-containing compounds of greater than or equal to 100 ppmw based on the total weight of the plastic derived oil stream.

A thirty-second aspect of the present disclosure may include either one of the thirtieth or thirty-first aspects, further comprising: a pyrolysis reactor upstream of the fluidized bed reactor, where the pyrolysis reactor may be configured to subject a liquefied plastic stream to pyrolysis to produce the plastic derived oil stream; and a dehalogenation reactor upstream of the pyrolysis reactor, where the dehalogenation reactor may be configured to melt solid plastic waste to produce the liquefied plastic stream.

A thirty-third aspect of the present disclosure may include any one of the thirtieth through thirty-second aspects, where the fluidized bed reactor may be a riser reactor or a downer reactor.

A thirty-fourth aspect of the present disclosure may include any one of the thirtieth through thirty-third aspects, where the red mud particles may comprise $Fe_2O_3$, $Al_2O_3$, CaO, $SiO_2$, and $NaO_2$.

A thirty-fifth aspect of the present disclosure may include the thirty-fourth aspect, where the red mud particles further may comprise $TiO_2$.

A thirty-sixth aspect of the present disclosure may include any one of the thirtieth thirty-fifth aspects, where the red mud particles may comprise from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud particles.

A thirty-seventh aspect of the present disclosure may include any one of the thirtieth through thirty-sixth aspects, where the matrix material may be kaolin clay and the binder may be alumina.

A thirty-eighth aspect of the present disclosure may include the thirty-seventh aspect, where the alumina may be peptized alumina.

A thirty-ninth aspect of the present disclosure may include any one of the thirtieth through thirty-eighth aspects, where the decontamination catalyst may have one or more of the following properties: a specific surface area of from 15 $m^2/g$ to 50 $m^2/g$, as determined according to the BET method; a total pore volume of from 0.07 $cm^3/g$ to 0.1 $cm^3/g$; an average pore size of from 100 nm to 150 nm; or an average particle size of from 10 μm to 200 μm.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process comprising contacting a plastic derived oil stream with a decontamination catalyst in a fluidized bed reactor at a reaction temperature of from 350° C. to 450° C. to produce a decontaminated plastic derived oil and a used decontamination catalyst, where:

the plastic derived oil stream comprises halogen-containing compounds;

the decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst;

the contacting the plastic derived oil stream with the decontamination catalyst at reaction conditions causes at least a portion of the halogen-containing compounds to react to form hydrocarbons and hydrogen halides, where the hydrogen halides further react with the red mud particles to produce metal halides on surfaces of the red mud particles; and the decontaminated plastic derived oil has a concentration of the halogen-containing compounds less than a concentration of the halogen-containing compounds in the plastic derived oil stream.

2. The process of claim 1, where the concentration of halogen-containing compounds in the decontaminated plastic derived oil is less than 100 parts per million by weight (ppmw) based on the mass flow rate of the decontaminated plastic derived oil.

3. The process of claim 1, where the hydrocarbons produced through removal of the halogen atoms through reactive adsorption remain in the decontaminated plastic derived oil.

4. The process of claim 1, where the decontaminated plastic derived oil has a concentration of hydrocarbons having less than or equal to 4 carbon atoms of less than 10 wt. %.

5. The process of claim 1, comprising contacting the plastic derived oil stream with the decontamination catalyst in the fluidized bed reactor at a pressure of from 100 kPa to 1000 kPa, and at a catalyst-to-oil weight ratio of from 2 to 40, wherein the catalyst-to-oil weight ratio in the fluidized bed reactor is equal to a mass flow rate of the decontamination catalyst divided by a mass flow rate of the plastic derived oil stream in the fluidized bed reactor at steady state.

6. The process of claim 5, further comprising adjusting the catalyst-to-oil weight ratio in the fluidized bed reactor based on the concentration of the halogen-containing compounds in the plastic derived oil stream, where adjusting the catalyst-to-oil weight ratio in the fluidized bed reactor comprises:

determining a concentration of the halogen-containing compounds in the plastic derived oil stream upstream of the fluidized bed reactor; and adjusting a mass flow rate of the plastic derived oil stream to the fluidized bed reactor, a mass flow rate of the decontamination catalyst to the fluidized bed reactor, or both, where the catalyst-to-oil weight ratio is adjusted in proportion to the concentration of the halogen-containing compounds in the plastic derived oil stream.

7. The process of claim 1, further comprising separating the used decontamination catalyst from the decontaminated plastic derived oil, regenerating the used decontamination catalyst in a catalyst regenerator to produce a regenerated decontamination catalyst, and passing the regenerated decontamination catalyst back to the fluidized bed reactor.

8. The process of claim 7, where regenerating the used decontamination catalyst comprises contacting the used decontamination catalyst with a regeneration gas in the catalyst regenerator, where the regeneration gas is an oxygen-containing gas.

9. The process of claim 1, further comprising producing the plastic derived oil stream from solid waste plastic, where producing the plastic derived oil stream comprises:

liquefying the solid plastic waste in a dehalogenation reactor to produce a liquefied plastic stream having a concentration of halogen compounds less than the solid plastic waste;

passing the liquefied plastic stream to a pyrolysis reactor downstream of the dehalogenation reactor; and subjecting the liquefied plastic stream to pyrolysis in the pyrolysis reactor to produce the plastic derived oil stream.

10. The process of claim 1, where the red mud particles comprise from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud particles.

11. The process of claim 1, where the matrix material is kaolin clay and the binder is alumina.

12. The process of claim 1, where the decontamination catalyst has a specific surface area greater than a specific surface area of the red mud particles, where the specific surface area is determined according to the Brunauer-Emmett-Teller (BET) method.

13. The process of claim 1, where the decontamination catalyst has a total pore volume greater than a total pore volume of the red mud particles.

14. The process of claim 1, where the decontamination catalyst has an average pore size less than an average pore size of the red mud particles.

15. The process of claim 1, where the decontamination catalyst has one or more of the following properties:

a specific surface area of from 20 $m^2/g$ to 50 $m^2/g$, as determined according to the BET method;

a total pore volume of from 0.07 $cm^3/g$ to 0.1 $cm^3/g$;

an average pore size of from 100 nm to 150 nm; or an average particle size of from 10 μm to 200 μm.

16. A system for upgrading plastic derived oil, the system comprising:

a fluidized bed reactor containing a decontamination catalyst, where:

the decontamination catalyst comprises from 5 wt. % to 40 wt. % red mud particles, from 20 wt. % to 60 wt. % matrix material, and from 10 wt. % to 30 wt. % binder, based on the total weight of the decontamination catalyst;

where the decontamination catalyst has a specific surface area greater than a specific surface area of the red mud particles, where the specific surface area is determined according to the Brunauer-Emmett-Teller (BET) method; and the fluidized bed reactor is configured to contact a plastic derived oil stream with the decontamination catalyst to produce decontaminated plastic derived oil;

a fluid-solid separation unit disposed at an outlet end of the fluidized bed reactor, the fluid-solid separation unit configured to separate the decontaminated plastic derived oil from a used decontamination catalyst;

a catalyst regenerator disposed downstream of the fluid-solid separation unit, the catalyst regenerator configured to regenerate the used decontamination catalyst to produce a regenerated decontamination catalyst, where the catalyst regenerator is in fluid communication with the fluidized bed reactor to pass the regenerated decontamination catalyst back to the fluidized bed reactor.

17. The system of claim 16, where the system further comprises the plastic derived oil stream comprising the plastic derived oil, where the plastic derived oil stream has a concentration of halogen-containing compounds of greater than or equal to 100 ppmw based on the total weight of the plastic derived oil stream.

18. The system of claim 16, further comprising:

a pyrolysis reactor upstream of the fluidized bed reactor, where the pyrolysis reactor is configured to subject a liquefied plastic stream to pyrolysis to produce the plastic derived oil stream; and a dehalogenation reactor upstream of the pyrolysis reactor, where the dehalogenation reactor is configured to melt solid plastic waste to produce the liquefied plastic stream.

19. The system of claim 16, where the red mud particles comprise from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud particles.

20. The system of claim 16, where the decontamination catalyst has one or more of the following:

a specific surface area of from 15 $m^2/g$ to 50 $m^2/g$, as determined according to the BET method;

a total pore volume of from 0.07 $cm^3/g$ to 0.1 $cm^3/g$;

an average pore size of from 100 nm to 150 nm; and an average particle size of from 10 μm to 200 μm.

* * * * *